(12) United States Patent
Weber

(10) Patent No.: US 9,464,217 B2
(45) Date of Patent: Oct. 11, 2016

(54) COMPOSITE STRUCTURES USING INTERPENETRATING POLYMER NETWORK ADHESIVES

(71) Applicant: The Boeing Company, Chicago, IL (US)

(72) Inventor: Gary Robert Weber, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 370 days.

(21) Appl. No.: 14/107,705

(22) Filed: Dec. 16, 2013

(65) Prior Publication Data

US 2014/0103254 A1 Apr. 17, 2014

Related U.S. Application Data

(63) Continuation of application No. 12/873,537, filed on Sep. 1, 2010, now Pat. No. 8,882,956.

(51) Int. Cl.

| | |
|---|---|
| *C09K 3/00* | (2006.01) |
| *C08L 63/00* | (2006.01) |
| *C08F 283/00* | (2006.01) |
| *C09J 163/00* | (2006.01) |
| *C08L 33/08* | (2006.01) |
| *C08G 59/50* | (2006.01) |

(Continued)

(52) U.S. Cl.
CPC .......... *C09J 163/00* (2013.01); *C08G 59/5073* (2013.01); *C08L 33/08* (2013.01); *B29C 65/1403* (2013.01); *B29C 65/1406* (2013.01); *B29C 65/485* (2013.01); *B29C 65/4835* (2013.01); *B29C 65/4845* (2013.01); *B29C 66/1122* (2013.01); *B29C 66/721* (2013.01); *B29C 66/742* (2013.01); *B29C 66/7422* (2013.01); *B29L 2031/3076* (2013.01); *C08L 2312/00* (2013.01)

(58) Field of Classification Search
CPC ....................................................... C09J 163/00
USPC .................................................... 252/182.18
See application file for complete search history.

(56) References Cited

U.S. PATENT DOCUMENTS 5,709,948 A    1/1998  Perez et al.
5,925,379 A *  7/1999  Mandeville, III ..... A61K 31/74
                                                       424/484

(Continued)

FOREIGN PATENT DOCUMENTS

EP          2426180 A2      3/2012
JP     2002080811 A  *  3/2002  ............ C09J 163/00

(Continued)

OTHER PUBLICATIONS

Fujita et al., JP 2002-080811 A machine translation in English, Mar. 22, 2002.*

(Continued)

*Primary Examiner* — David Karst
(74) *Attorney, Agent, or Firm* — Yee & Associates, P.C.

(57) ABSTRACT

A composition is provided that consists essentially of a first polymer system and a second polymer system. The first polymer system has a first modulus of about 180 ksi to about 335 ksi. The first polymer system consists essentially of a thermosetting acrylate. The second polymer system consists essentially of a thermosetting epoxy system and an epoxy curing agent. The thermosetting epoxy system comprises a first epoxy.

20 Claims, 12 Drawing Sheets

(51) Int. Cl.
    B29C 65/14    (2006.01)
    B29C 65/48    (2006.01)
    B29C 65/00    (2006.01)
    B29L 31/30    (2006.01)

(56) References Cited

U.S. PATENT DOCUMENTS

| | | | |
|---|---|---|---|
| 5,997,682 A | 12/1999 | Goodman et al. | |
| 6,054,007 A * | 4/2000 | Boyd | B41J 2/16 156/245 |
| 7,572,491 B2 | 8/2009 | Wang et al. | |
| 7,790,288 B2 | 9/2010 | Perez et al. | |
| 8,882,956 B2 | 11/2014 | Weber | |
| 2005/0256241 A1 * | 11/2005 | Sachdev | C08K 3/08 524/439 |
| 2006/0283133 A1 | 12/2006 | Westre et al. | |
| 2007/0036982 A1 | 2/2007 | Perez et al. | |
| 2009/0095413 A1 | 4/2009 | Westre et al. | |
| 2012/0052305 A1 | 3/2012 | Weber | |
| 2014/0103254 A1 | 4/2014 | Weber | |

FOREIGN PATENT DOCUMENTS

| | | | | |
|---|---|---|---|---|
| JP | 2004099786 A * | 4/2004 | | C08L 63/00 |
| WO | WO9700923 A1 | 1/1997 | | |

OTHER PUBLICATIONS

Hasegawa et al., JP 2004-099786 A machine translation in English, Apr. 2, 2004.*

Office Action, dated Jan. 6, 2016, regarding USPTO U.S. Appl. No. 14/316,794, 21 pages.

Extended European Search Report, dated May 8, 2015, regarding Application No. EP14197992.2, 4 pages.

Davis, "General Characteristics of Engineering Plastics," Guide to Materials Selection, Engineered Materials Handbook Desk Edition, ASM International, 1995, 5 pages.

Office Action, dated Dec. 23, 2013, regarding USPTO U.S. Appl. No. 12/873,537, 12 pages.

Final Office Action, dated May 16, 2014, regarding USPTO U.S. Appl. No. 12/873,537, 11 pages.

Notice of Allowance, dated Jul. 14, 2014, regarding USPTO U.S. Appl. No. 12/873,537, 8 pages.

Weber, "Interpenetrating Polymer Network Adhesives," Dissertation, University of Washington, Dec. 2012, 204 pages.

Extended European Search Report, dated Apr. 7, 2016, regarding application No. EP11178793.3, 5 pages.

Chen et al., "Curing kinetics and morphology of IPNs from a flexible dimethacrylate and a rigid epoxy via sequential photo and thermal polymerization," European Polymer Journal, vol. 44, No. 6, Jun. 2008, pp. 1796-1813.

Dean et al , "Azo initiator selection to control the curing order in dimethacrylatelepoxy interpenetrating polymer networks," Polymer International, vol. 53, No. 9, Sep. 2004, pp. 1305-1313.

Dean et al., "Effect of Curing Sequence on the Photopolymerization and Thermal Curing Kinetics of Dimethacrylatel Epoxy Interpenetrating Polymer Networks," Macromolecules, vol. 35, No. 21, Oct. 2002, pp. 7942-7954.

Dean et al., "Small angle neutron scattering and dynamic mechanical thermal analysis of dimethacrylatelepoxy IPNs," European Polymer Journal, vol. 42, No. 10, Oct. 2006, pp. 2872-2887.

Dubuisson et al., "Homogeneous Epoxy-Acrylic Interpenetrating Polymer Networks: Preparation and Thermal Properties," Polymer Bulletin, vol. 3, No. 6-7, Nov. 1980, pp. 391-398.

Hara, "Curing Agents for Epoxy Resin," Three Bond Technical News, vol. 32, Dec. 1990, 10 pages.

Janke et al., "Electron Beam Curing of Epoxy Resins by Cationic Polymerization," Proceedings of the 41st International SAMPE Symposium and Exhibition, Mar. 1996, pp. 196-206.

Janke et al., "Toughened Epoxy Resins Cured by Electron Beam Radiation," Proceedings of the 28th International SAMPE Technical Conference, Nov. 1996, pp. 877-889.

Kerluke et al., "Electron Beam Processing for Automotive Composite Application," Proceedings of the 2nd Annual Automotive Composites Conference, Sep. 2002, 5 pages.

Lin et al., "Kinetics studies of hybrid structure formation by controlled photopolymerization," Polymer, vol. 44, No. 17, Aug. 2003, pp. 4781-4789.

Lopata et al., "Electron Beam Processing for Composite Manufacturing and Repair," Radtech Report, Sep./Oct. 2003, vol. 17, No. 5, pp. 32-42.

Nowers et al., "Structure—property relationships in acrylate/epoxy interpenetrating polymer networks: Effects of the reaction sequence and composition," Journal of Applied Polymer Science, vol. 104, No. 2, Apr. 2007, pp. 891-901.

Nowers et al., "The effect of interpenetrating polymer network formation on polymerization kinetics in an epoxy-acrylate system," Polymer, vol. 47, No. 4, Feb. 2006, pp. 1108-1118.

Oxman et al., "Evaluation of initiator systems for controlled and sequentially curable free-radical/cationic hybrid photopolymerizations," Journal of Polymer Science Part A: Polymer Chemistry, vol. 43, No. 9, May 2005, pp. 1747-1756.

Park et al., "UV- and thermal-curing behaviors of dual-curable adhesives based on epoxy acrylate oligomers," International Journal of Adhesion & Adhesives, vol. 29, No. 7, Oct. 2009, pp. 710-717.

Sands et al., "Interpenetrating Polymer Network (IPN) Adhesives for Electron Beam Cure," Army Research Laboratory Report No. ARL-TR-2321, Sep. 2000, 49 pages.

"High Temperature Resistant IPN Adhesives," Polymerics GmbH, Jan. 8, 2002, 2 pages. Retrieved Jun. 28, 2012 from http://polymerics.de/products/ipn_en.html.

Office Action, dated Oct. 25, 2012, regarding USPTO U.S. Appl. No. 12/873,537, 10 pages.

Final Office Action, dated Apr. 8, 2013, regarding USPTO U.S. Appl. No. 12/873,537, 8 pages.

Notice of Allowance, dated Jul. 19, 2013, regarding USPTO U.S. Appl. No. 12/873,537, 6 pages.

* cited by examiner

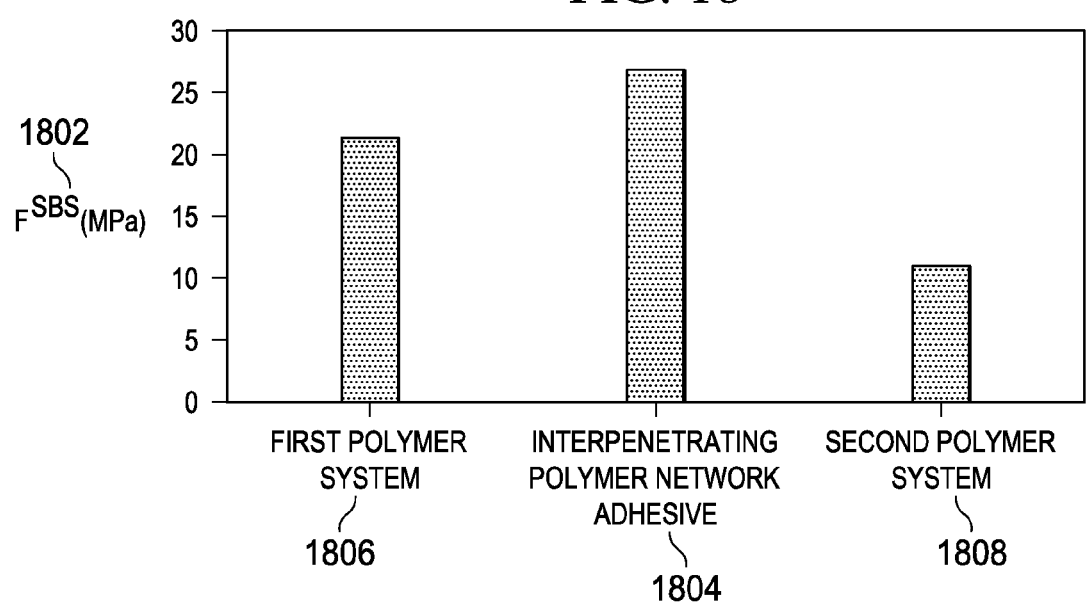

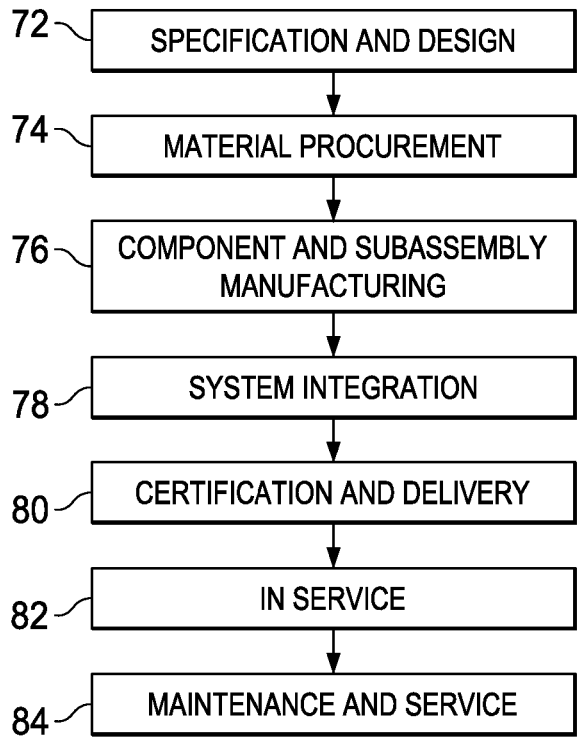
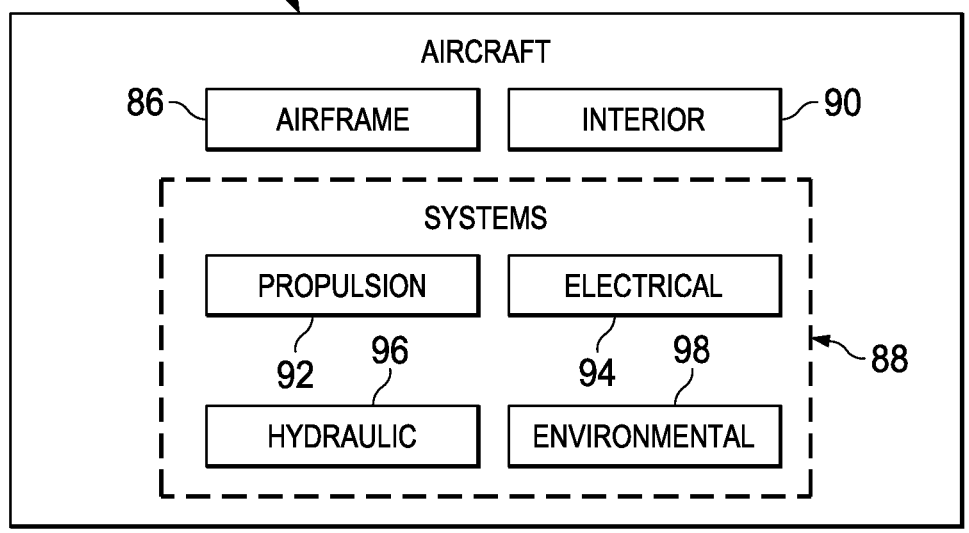

COMPOSITE STRUCTURES USING INTERPENETRATING POLYMER NETWORK ADHESIVES

CROSS REFERENCE TO RELATED APPLICATION

This application is a continuation-in-part of U.S. patent application Ser. No. 12/873,537 filed Sep. 1, 2010, status pending, the entire disclosure of which is incorporated by reference herein.

TECHNICAL FIELD

This disclosure generally relates to composite structures, and deals more particularly with adhesives used in such composites.

BACKGROUND

Composite structures comprising parts that have different coefficients of thermal expansion may induce residual stresses in the structure during thermal curing or other fabrication processes that cause the parts to thermally expand at different rates. For example, and without limitation, hybrid composite structures comprising a metal reinforced with carbon fiber polymers may be subject to thermal induced distortion while curing at elevated temperatures. In some cases, this problem may be addressed by using fiber reinforced polymers that cure at room temperature, or which may be cured using various forms of radiation. However, room temperature cure polymers may have a short working life, long cure times, and require extra clean-up work. Room temperature cure polymers may also exhibit reduced performance characteristics compared to polymers that are cured at elevated temperatures. Known radiation cured adhesives may be more brittle than desired and exhibit lower than desired toughness, which may render these adhesives unsuitable for some applications, particularly where resistance to impact loads is valued.

Interpenetrating polymer networks (IPN) have been used as an adhesive in composite structures. IPNs are based on polymer systems that cure at different temperatures using differing cure mechanisms, but may exhibit properties that are superior to those of their constituent polymer systems. However, IPNs have not been adapted for solving the problem of residual stresses that are induced in composites by the differential expansion of the components of which the composite is formed.

Accordingly, there is a need for an IPN adhesive that may be used to reduce or eliminate residual stresses in composite structures that may be caused by differential expansion of differing components used in the structure, such as metals reinforced with carbon fiber polymers. There is also a need for a method of making composite structures that employ IPN adhesives to reduce or eliminate the residual stresses.

SUMMARY

In one illustrative embodiment, a composition is presented. The composition consists essentially of a first polymer system and a second polymer system. The first polymer system has a first modulus of about 180 ksi to about 335 ksi. The first polymer system consists essentially of a thermosetting acrylate. The second polymer system consists essentially of a thermosetting epoxy system and an epoxy curing agent. The thermosetting epoxy system comprises a first epoxy.

In another illustrative embodiment, a composition is present. The composition consists essentially of a first polymer system and a second polymer system. The first polymer system has a first modulus of about 180 ksi to about 335 ksi. The first polymer system consists essentially of a thermosetting acrylate and a trifunctional acrylate. The second polymer system consists essentially of a thermosetting epoxy system and an epoxy curing agent. The thermosetting epoxy system comprises a first epoxy.

The features, functions, and advantages can be achieved independently in various embodiments of the present disclosure or may be combined in yet other embodiments in which further details can be seen with reference to the following description and drawings.

BRIEF DESCRIPTION OF THE ILLUSTRATIONS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 18 is an illustration of a graphical plot of an interpenetrating polymer network in contrast to its constituents.

FIG. 19 is a flow diagram of aircraft production and service methodology in which an illustrative embodiment may be implemented.

FIG. 20 is a block diagram of an aircraft in accordance with an illustrative embodiment.

DETAILED DESCRIPTION

Figure 1:
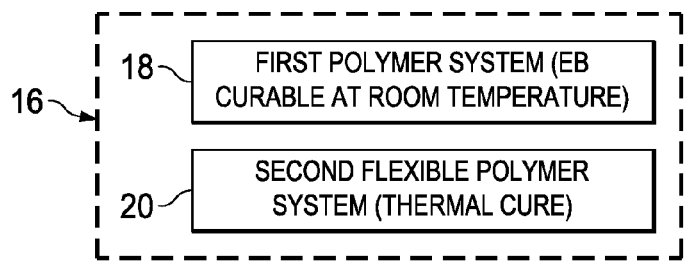
FIG. 1 is an illustration of a functional block diagram of an IPN adhesive according to the disclosed embodiments.

Illustrative examples provide an IPN adhesive that can be used to fabricate composite structures, and particularly hybrid structures employing both polymer resins and metals that may substantially reduce residual stresses in the structure caused by differential thermal expansion of the composite materials. The disclosed IPN adhesive comprises two polymer adhesive systems that may be cured at differing temperatures. One of the polymer systems may be cured at room temperature using a beam of radiation, such as an electron beam. Curing of the first polymer system at room temperature holds the composite parts together so that they are fixed relative to each other as the structure is being fully cured. Curing of the second polymer adhesive is achieved by thermal cycling at elevated temperatures. The second polymer adhesive, when cured, remains flexible which may renders the composite structure more tolerant of impact loads, and less susceptible to barely visible impact damage (BVID).

In addition to increasing strength and durability, use of the disclosed IPN adhesive may result in weight savings by providing an effective way to reinforce metal parts such as aluminum, and may reduce tooling costs complexity while reducing process flow times.

The illustrative examples recognize and take into account that previous attempts to increase a composite strength utilized a polyepoxide network such as diglycidyl ether of bisphenol A (DGEBA). In these previous attempts, toughness was developed through the incorporation of thermoplastic tougheners. Specifically, in some previous attempts, the thermoplastic tougheners were incorporated in the ratio of about 20 to about 40 parts per hundred epoxide. By using thermoplastic tougheners, the resulting epoxy network of previous attempts is toughened due to the presence of cure-induced phase separation of thermoplastic particles. The illustrative examples herein recognize and take into account that it may be desirable to increase the toughness of an epoxy network without the use of thermoplastic tougheners.

The illustrative embodiments also recognize and take into account that creating an interpenetrating polymer network (IPN) uses two or more polymer components that have differing chemical properties. The result of incorporating two or more polymer components into an IPN results in an IPN with properties that vary significantly from those of the individual polymer components. For example, the illustrative embodiments recognize and take into account that polymer performance properties may be linked to the glass transition temperature, $T_g$. The individual components of an IPN typically have different, distinct glass transition temperatures. However, fully interpenetrating IPNs exhibit a single, broadened glass transition temperature.

A sequential IPN is an IPN which is formed by first curing a first polymer system and later curing a second polymer system. The illustrative embodiments further recognize and take into account that when a sequential IPN is created, the polymer system which cures first establishes the strength of the IPN. The second polymer system remains highly deformable. Accordingly, the monomer for the second polymer network may be rearranged to decrease the inner stresses in the forming IPN. Due to restrictions imposed by the cured first polymer system, the second polymer network cures at a low rate, reducing internal stresses. The illustrative embodiments thus take into account that the polymer system which cures second, therefore, plays the role of "plasticizer." A plasticizer may be a material which provides increased flexibility to a composition. Further, a plasticizer may increase the durability of a composition.

Referring first to FIG. 1, the disclosed embodiments relate to a full-interpenetrating network (IPN) adhesive 16 which may be used as a bonding adhesive or as a matrix in composite structures. The IPN adhesive 16 broadly comprises a first polymer system 18 and a second flexible polymer system 20. The first polymer system 18 may be cured at or near room temperature using a beam (not shown) of radiation, such as an electron beam, however other forms of radiation including but not limited to UV (ultra violet) and X-ray radiation may be employed. The second polymer system 20 exhibits flexibility and toughness following curing, which is performed at elevated temperature during a suitable thermal cure cycle. As will be described below in more detail, the first polymer system 18 is cured at or near room temperature during the fabrication process to adhesively bond and effectively lock two or more parts (not shown) together. The adhesive bond formed between the parts by the first polymer system 18 holds the parts in place and prevents them from differentially expanding while the second polymer system 20 is thermally curing. Locking the parts together in this manner may reduce or eliminate the possibility of distortion of the parts during the fabrication process. The flexible second polymer system 20 provides the bond with both flexibility and toughness.

The first polymer system 18 may comprise an acrylated polymer such as acrylated epoxy. For example and without limitation, the acrylated epoxy may comprise one of bisphenol A diacrylate (BPADA) with a trifunctional acrylate, and trimethylolpropane triacrylate (TMPTA) cross-linking agent. The second flexible polymer system 20 may be one selected from the group consisting of flexible epoxies and vinyl esters. For example and without limitation, the second flexible polymer system may be one of Bis(3,4-EpoxyCyclohexylmethyl) Adipate (BECA) and the combination of a Diglycidyl ether of bisphenol A (DGEBA) with a Polypropylene Glycol Diglycidyl Ether (PPGDE) chain extender with an imidazole such as 2-Ethyl 4-Methylimidazole (EMI) or an anhydride as the curing catalyst.

Although not shown in the Figures, the second flexible polymer system 20 may include a suitable thermal cure initiator, such as, without limitation, imidazole or anhydride for cross linking the second polymer system 20. In one practical embodiment, the IPN adhesive 16 comprises about 67 percent acrylate and 33 percent flexible epoxy (including the curing agent). In another practical embodiment, the IPN adhesive 16 comprises about 40 percent acrylate, and about 60 percent flexible epoxy.

Figure 2:
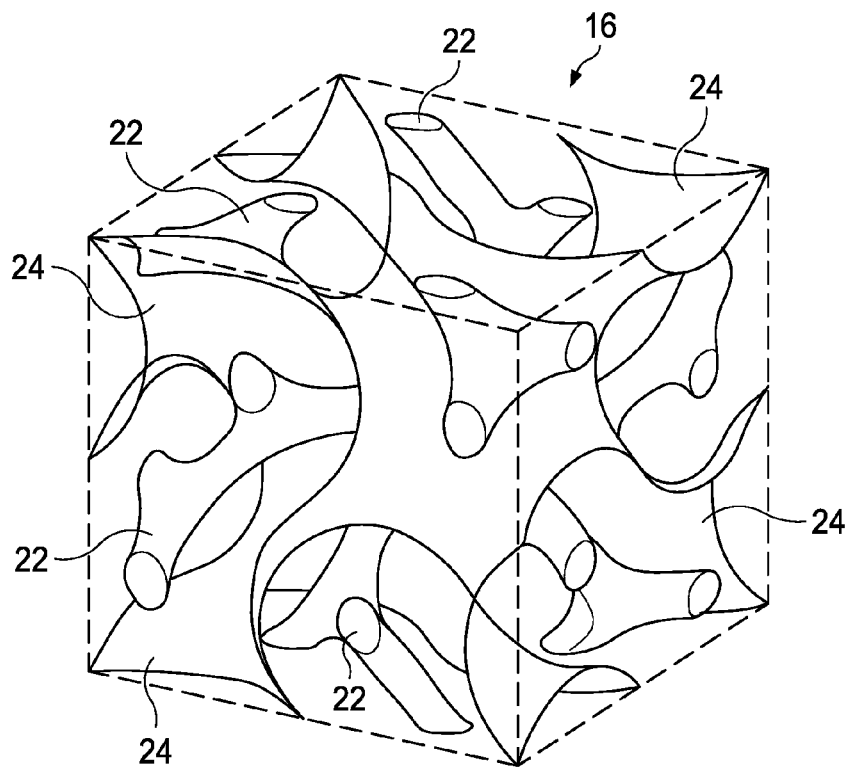
FIG. 2 is an illustration of the IPN adhesive of FIG. 1, showing a bi-continuous structure formed by dual polymer adhesive systems.

FIG. 2 illustrates the IPN adhesive 16 in a fully cured state in which the two polymer systems 18, 20 respectively form bi-continuous structural networks 22, 24 that are intertwined to form what is sometimes referred to as a double gyroidal structure. The structural network 22 formed by the first polymer system 18 may function as a relatively high strength adhesive to bond parts together, but which may exhibit some degree of brittleness. The second structural network 24 formed by the second polymer system 20 is relatively flexible, providing the IPN adhesive 16 with resistance to impact loading.

Figure 3:
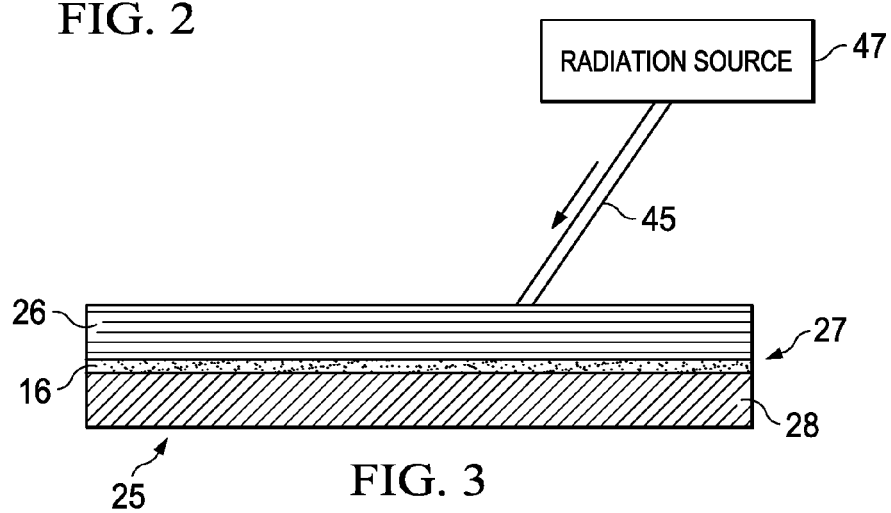
FIG. 3 is a sectional view of a hybrid composite structure, in which the parts are bonded together using the IPN adhesive.
Figure 4:
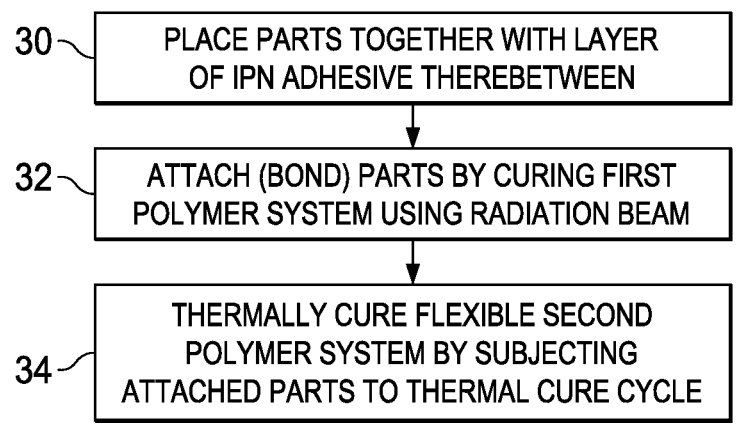
FIG. 4 is an illustration of a flow diagram of a method of bonding two parts of FIG. 3 together using the IPN adhesive.

FIG. 3 illustrates a hybrid composite structure 25 comprising two parts 26, 28 which may respectively comprise for example and without limitation, a composite laminate, and a metal. The two parts 26, 28 may be bonded together using a layer 27 of the IPN adhesive 16. Referring also now to FIG. 4, the hybrid composite structure 25 may be fabricated by a method that begins at step 30 in which the parts 26, 28 are placed together with the layer 27 of the IPN adhesive 16 therebetween.

Next, at step 32, the parts 26, 28 are bonded together by curing the first polymer system 18 (FIG. 1) using a beam 45 of radiation (FIG. 5) that is directed onto the structure 25 from a suitable radiation source 47. The curing process performed at step 32 may be carried out at or near room temperature, consequently the parts 26, 28 are initially bonded together without differential expansion that may be caused by curing at elevated temperatures. Finally, at step 34, the second polymer system 20 is thermally cured by subjecting the assembled composite structure 25 to a thermal cure cycle at elevated temperatures. During this thermal curing, differential thermal expansion of the parts 26, 28 is substantially reduced or eliminated due to the fact that the parts 26, 28 have already been bonded together, and thus are fixed relative to each other by the first polymer system.

Figure 5:
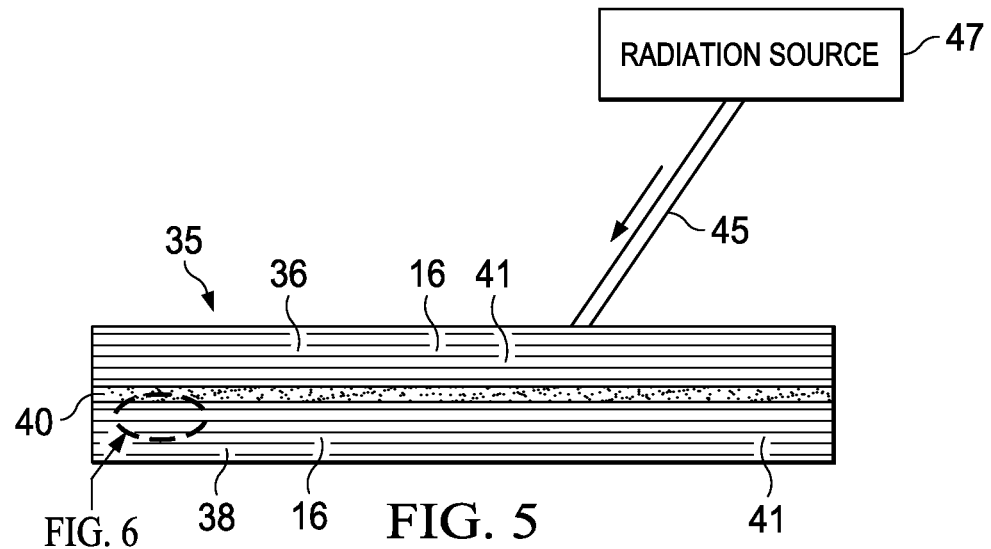
FIG. 5 is an illustration of a sectional view of two co-cured composite laminates joined together by a layer of the IPN adhesive.
Figure 6:
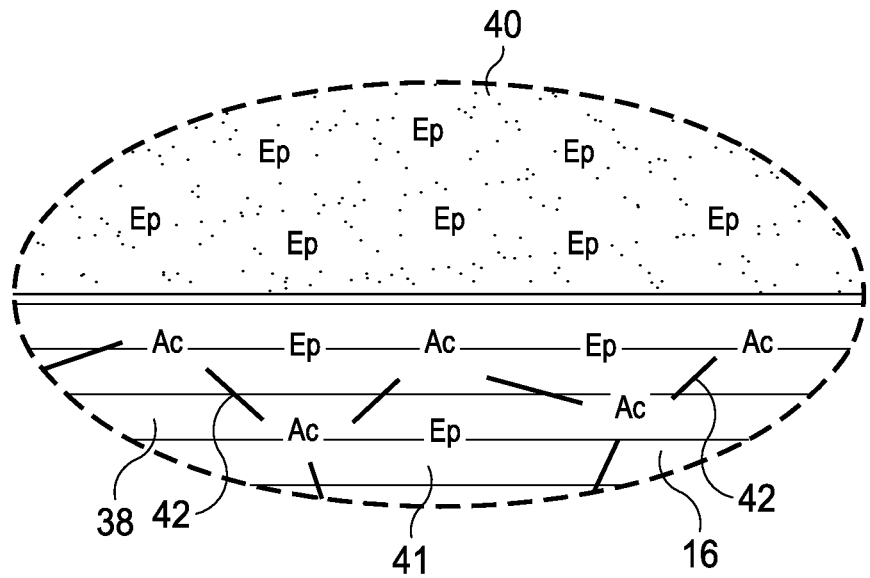
FIG. 6 is an illustration of the area designated as FIG. 6 in FIG. 5.

FIGS. 5 and 6 illustrate another application of the IPN adhesive 16 (FIG. 1). In this example, two multi-ply, fiber reinforced laminates 36, 38 are joined together by a layer 40 of a flexible polymer adhesive such as a flexible epoxy to form a composite structure 35. As shown in FIG. 6, each of the laminates 36, 38 comprises a fiber reinforcement 41 held and embedded in a matrix comprising the IPN adhesive 16 described previously. Thus, each of the laminates 36, 38 comprises bi-continuous first and second polymer systems 18, 20 as described above in connection with FIGS. 1 and 2, while the layer 40 comprises a thermally curable, flexible polymer such as a flexible epoxy which may be substantially the same as the second flexible polymer system 20 forming part of the IPN adhesive matrix 16. As will be discussed below, when the composite structure 35 is fully cured, the second flexible polymer system 20 (FIG. 1) extends continuously from one laminate 36 through bond layer 40 to the other laminate 38.

Figure 7:
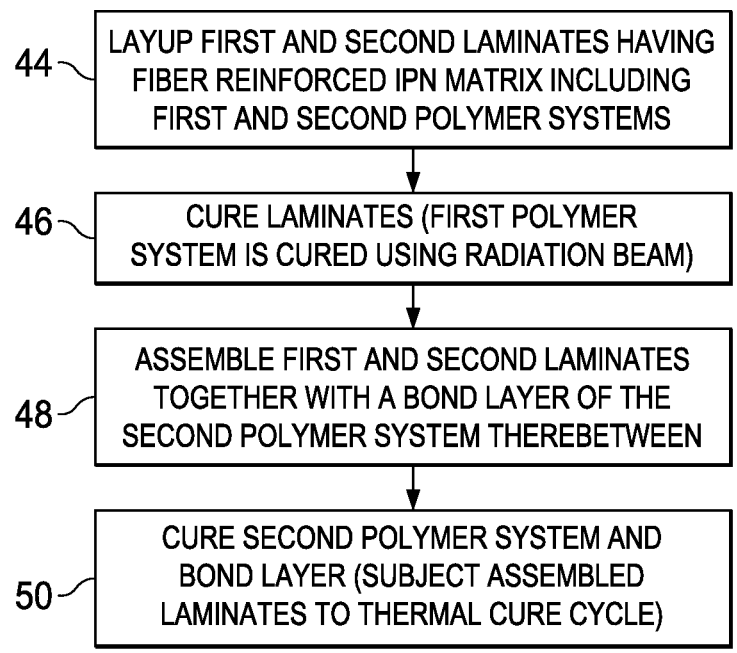
FIG. 7 is an illustration of a flow diagram of a method of fabricating the composite structure shown in FIGS. 5 and 6.

FIG. 7 illustrates a method of fabricating the composite structure 35 shown in FIGS. 5 and 6. Beginning at 44, first and second laminates 36, 38 are formed by laying up plies (not shown) of prepreg (not shown) using conventional processes and tooling suitable for the application. IPN adhesive 16 comprising the two unreacted, bi-continuous polymer systems 18, 20 (FIG. 1) is used as the ply matrix into which the fiber reinforcement 41 is embedded. Next, at step 46, each of the laminates 36, 38 is cured to at least a stage that allows the laminates to be handled by directing a beam 45 of radiation produced by a suitable radiation source 47 onto each of the laminates 36, 38. The radiation beam 45 may comprise an electron beam (EB), a UV beam or a beam of X-rays, or any other suitable radiation beam. This radiation beam curing, which may be carried out at or near room temperature, results in curing of the first polymer system 18 which forms one component of the ply matrix, and cross linking, shown by the numeral 42 in FIG. 6, of the first polymer system 18.

At this point, the second flexible polymer system 20 remains unreacted, however the curing of the first polymer system 18 stiffens the laminate 36, 38 to at least a stage allowing them to be handled as necessary for further processing. In fact, the following the room temperature curing, the laminates 36, 38 may have nearly as much rigidity as fully cured laminates, consequently, when placed together under pressure in tooling (not shown), the laminates 36, 38 may exhibit little or no deformation. At step 48, the laminates 36, 38 are assembled together using a bond layer 40 of a flexible, thermally curable polymer that may be substantially the same as that comprising the second flexible polymer system 20 forming part of the IPN adhesive 16. With the laminates 36, 38 having been assembled, then at step 50, the second flexible polymer system 20 along with the bond layer 40 are co-cured by subjecting the assembled laminates 36, 38 to a thermal cure cycle. It should be noted here that when imidazol is used as a curing agent, it results in a 2-step curing process. The first step is an epoxy adduct stage where the imidazole molecules simply attach themselves to the ends of epoxy molecules; this occurs at about 60 degrees C. and results in a significant increase in viscosity. The second step to the curing process is cross-linking of epoxies and epoxy adducts which occurs at about 160 degrees C.

Figure 8:
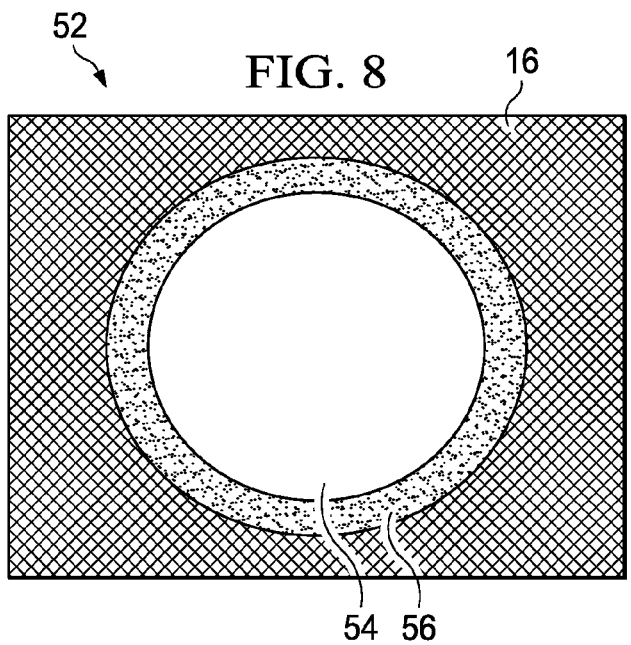
FIG. 8 is an illustration of a fiber embedded in an IPN adhesive matrix in which a gradient interface has been formed around the fiber.

FIG. 8 illustrates the use of the previously described IPN adhesive 16 as a matrix for holding a reinforcement 54 which may comprise fibers, beads, particles or other reinforcing media. As in previous examples, the IPN adhesive 16 comprises first and second polymer systems 18, 20 (FIG. 1) which are respectively curable at differing temperatures. The second flexible polymer system 20 (FIG. 1) which may comprise a flexible epoxy, has a higher surface tension than the first polymer system 18 which may comprise an acrylated epoxy. This higher surface tension causes the second flexible polymer system 20 to preferentially attach to the reinforcement 54, resulting in a gradient interface 56 around the reinforcement 54 that is somewhat flexible. The flexibility provided by the gradient layer 56 is advantageous in that it may assist in better transferring shear forces from the reinforcement 54 to the IPN adhesive matrix 16. Also, the gradient layer 56 may aid in establishing an improved bond between the IPN adhesive matrix 16 and the reinforcement 54. For example, where the IPN adhesive matrix 16 includes an acrylate that may not bond well to reinforcement 54 that is a carbon fiber, the flexible material forming the gradient layer 56 may improve the bond between the adhesive matrix 16 and the carbon fiber 54.

Use of the IPN 16 resulting in the formation of the gradient layer 56 may be advantageously employed in fabricating filament wound products (not shown). At the conclusion of wet filament winding or an RTM (resin transfer molding) process, an electron beam head (not shown) can be swept over the part to provide the initial cure. The entire structure will be dimensionally locked by this room temperature curing step, which may avoid the need for expensive tooling or autoclaves for the secondary thermal cure cycle.

Figure 9:
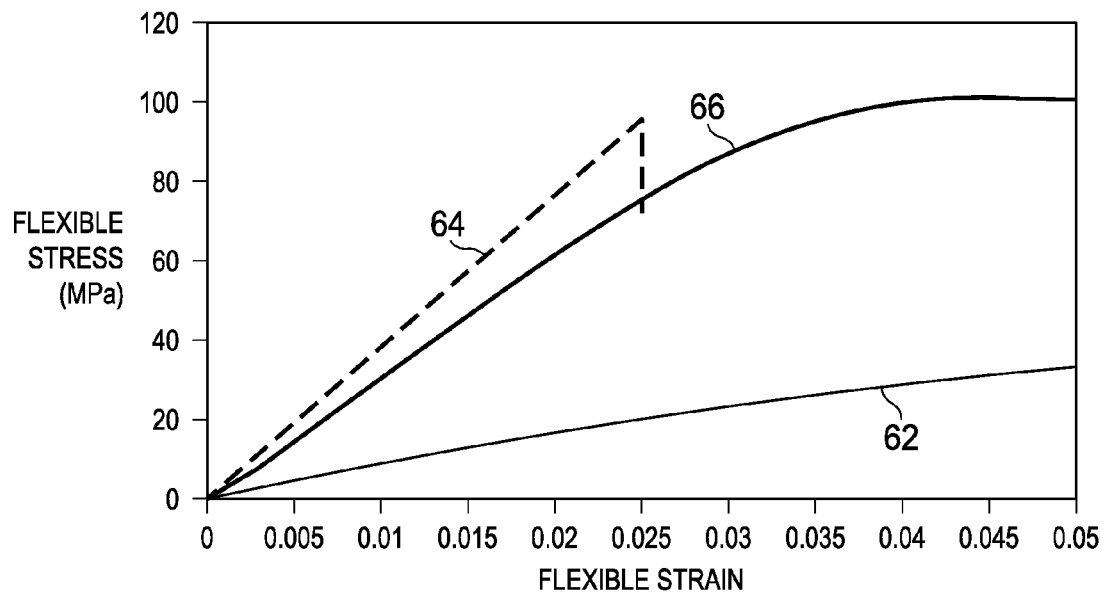
FIG. 9 is an illustration of a graphical plot of stress-strain performance of the polymer systems used in a disclosed IPN adhesive.

Attention is now directed to FIG. 9 which is a stress-strain performance plot that illustrates the improved performance provided by the systems 18, 20 forming the disclosed IPN adhesive 16. Curve 62 shows the performance of a flexible epoxy comprising a 50/50 mixture of two typical flexible epoxy components, while curve 64 shows the performance of a typical acrylate that includes 20 percent a content of a trifunctional acrylate. Curve 66 represents the performance of the disclosed IPN adhesive 16, which in this example, comprises a 50/50 combination of the flexible epoxy mixture represented by curve 62 and the acrylate mixture represented by curve 64.

Rather than lying half way between the curves, 62, 64, as might be normally expected, the performance of the dual system IPN 16 shown by curve 66 indicates that the IPN 16 has a modulus that approaches that of the stiffer acrylate (curve 64), and an elongation that approaches that of the flexible epoxy (curve 62). Thus, the first polymer system 18 (FIG. 1) provides the strength necessary for holding parts together but may have limited ability to deform upon an impact load, while the second flexible polymer system 20 provides the IPN 16 with the flexibility required to withstand impact loads. The second flexible polymer system 20 effectively allows the first polymer system 18 to move around and flex.

Figure 10:
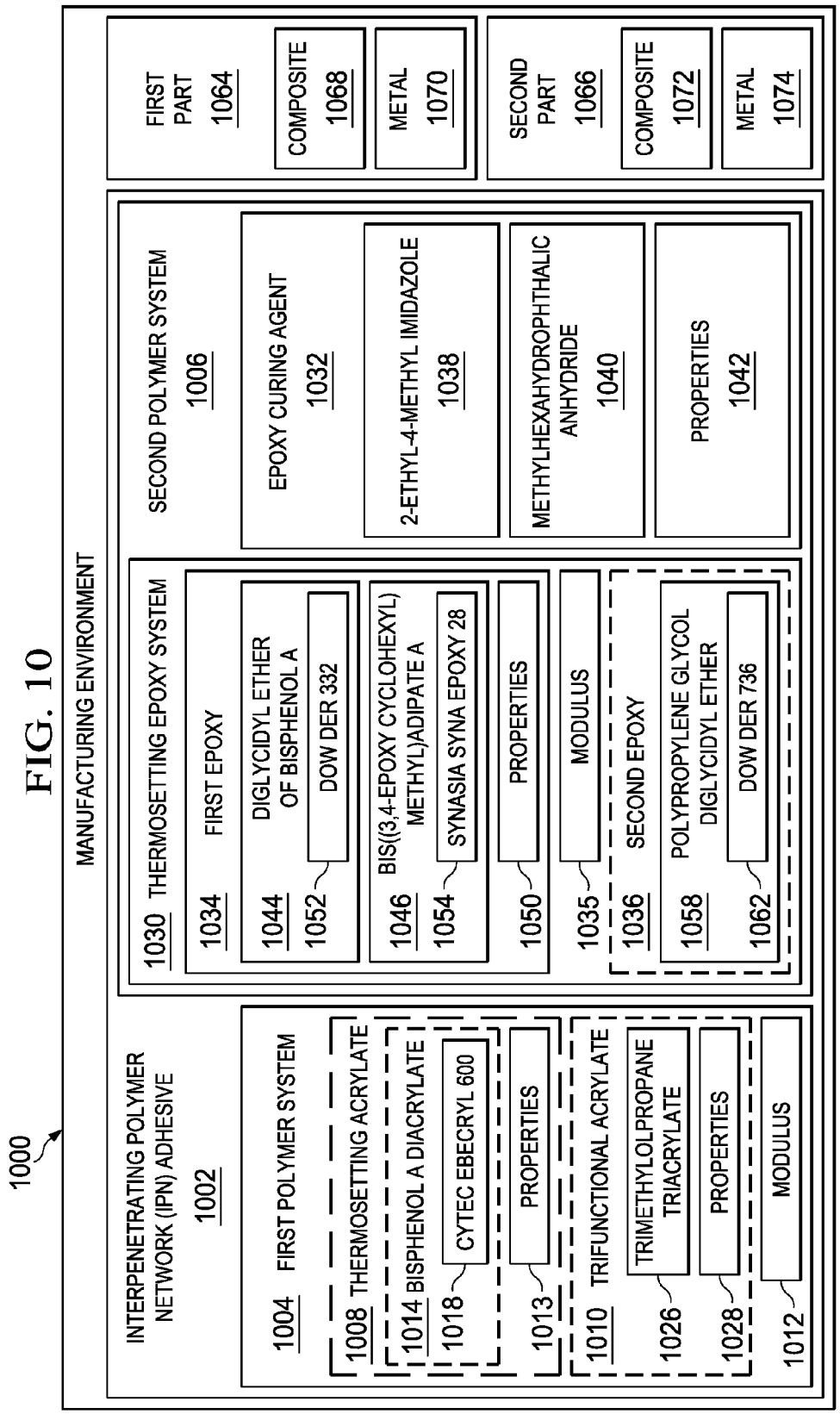
FIG. 10 is an illustration of a manufacturing environment in the form of a block diagram in accordance with an illustrative embodiment.

FIG. 10 is an illustration of a manufacturing environment in the form of a block diagram in accordance with an illustrative embodiment. In this illustrative example, manufacturing environment 1000 may be used to form interpenetrating polymer network adhesive 1002.

As depicted, interpenetrating polymer network adhesive 1002 comprises first polymer system 1004 and second polymer system 1006. First polymer system 1004 may be first polymer system 18 of FIG. 1. Second polymer system 1006 may be second flexible polymer system 20 of FIG. 1.

Interpenetrating polymer network adhesive 1002 may comprise a variety of different percentages of first polymer system 1004 and second polymer system 1006. In various illustrative examples, interpenetrating polymer network (IPN) adhesive 1002 may comprise about 10 weight percent, about 20 weight percent, about 30 weight percent, about 38 weight percent, about 40 weight percent, about 48 weight percent, about 50 weight percent, about 58 weight percent, about 60 weight percent, about 65 weight percent, about 70 weight percent, about 75 weight percent, about 80 weight percent, and about 90 weight percent of first polymer system 1004. Although a number of illustrative examples have been presented, these are non-limiting.

As depicted, first polymer system 1004 comprises thermosetting acrylate 1008 and trifunctional acrylate 1010. As depicted, both thermosetting acrylate 1008 and trifunctional acrylate 1010 are dashed. Both thermosetting acrylate 1008 and trifunctional acrylate 1010 are dashed as first polymer system 1004 comprises at least one of thermosetting acrylate 1008 and trifunctional acrylate 1010.

Thermosetting acrylate 1008 comprises an acrylate material which hardens when heated. An acrylate material comprises a vinyl group attached to a carbonyl carbon. Trifunctional acrylate 1010 comprises a monomer having three acrylate groups. A monomer having three acrylate groups has three vinyl groups, each attached to a respective carbonyl carbon.

First polymer system 1004 may be selected to provide modulus 1012. In some illustrative examples, modulus 1012 may be about 180 ksi (kilopounds per square inch) to about 335 ksi. Modulus 1012 is a modulus after cure of first polymer system 1004.

In one illustrative example, first polymer system 1004 comprises bisphenol a diacrylate 1014, and has modulus 1012 of about 312 ksi. In another illustrative example, first polymer system 1004 comprises 80 weight percent bisphenol a diacrylate 1014 and 20 weight percent trimethylolpropane triacrylate 1026, and has modulus 1012 of about 287 ksi. In yet another illustrative example, first polymer system 1004 comprises 60 weight percent bisphenol a diacrylate 1014 and 40 weight percent trimethylolpropane triacrylate 1026, and has modulus 1012 of about 333 ksi.

The phrase "at least one of," when used with a list of items, means different combinations of one or more of the listed items may be used or only one item in the list may be needed. For example, "at least one of item A, item B, or item C" may include, without limitation, only item A, item A and item B, or item B alone. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, "at least one of" means any combination of items and/or number of items may be used from the list but not all of the items in the list are required.

In some illustrative examples, first polymer system 1004 only has thermosetting acrylate 1008. In some illustrative examples, first polymer system 1004 only has trifunctional acrylate 1010. In other illustrative examples, first polymer system 1004 has both thermosetting acrylate 1008 and trifunctional acrylate 1010. First polymer system 1004 may be selected such that initiator molecules are not required for curing of first polymer system 1004 using a radiation source such as radiation source 47 of FIG. 3.

When first polymer system 1004 comprises both thermosetting acrylate 1008 and trifunctional acrylate 1010, first polymer system 1004 may comprise different percentages of thermosetting acrylate 1008 and trifunctional acrylate 1010. In one illustrative example, first polymer system 1004 comprises about 80 weight percent thermosetting acrylate 1008 and about 20 weight percent trifunctional acrylate 1010. In other illustrative examples, first polymer system 1004 comprises about 60 weight percent thermosetting acrylate 1008 and about 40 weight percent trifunctional acrylate 1010. In other words, first polymer system 1004 comprises a ratio of the thermosetting acrylate to the trifunctional acrylate which is about 3:2 by weight.

Thermosetting acrylate 1008 is selected to provide properties 1013. Properties 1013 of thermosetting acrylate 1008 may include at least one of yield strength, glass transition temperature, miscibility parameter compared to second polymer system 1006, chemical structure, and modulus. Properties 1013 may be selected to provide desirable properties to resultant interpenetrating polymer network adhesive 1002. In some illustrative examples, thermosetting acrylate 1008 may be bisphenol a diacrylate 1014.

Bisphenol a diacrylate 1014 may be denoted chemically as

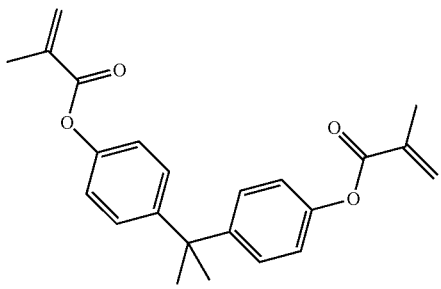 [SMILES: C=C(C)C(=O)Oc1ccc(C(C)(C)c2ccc(OC(=O)C(=C)C)cc2)cc1]

One illustrative example of commercially available bisphenol a diacrylate 1014 is cytec Ebecryl® 600 1018. Bisphenol a diacrylate 1014 may be obtained from other manufacturers and under other marketed product names.

Trifunctional acrylate 1010 may be selected to provide desirable properties to interpenetrating polymer network adhesive 1002. In some illustrative examples, trifunctional acrylate 1010 may be selected to modify a miscibility mismatch between thermosetting acrylate 1008 and second polymer system 1006. In some illustrative examples, trifunctional acrylate 1010 may be selected to modify the viscosity of the uncured mixture of first polymer system 1004 and second polymer system 1006. In one illustrative example, trifunctional acrylate 1010 may be trimethylolpropane triacrylate 1026. Trimethylolpropane triacrylate 1026 may be denoted chemically as

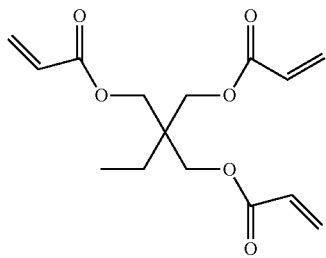 [SMILES: C=CC(=O)OCC(CC)(COC(=O)C=C)COC(=O)C=C]

One manufacturer of trimethylolpropane triacrylate 1026 is Sigma Aldrich. However, trifunctional acrylate 1010 may be obtained from other manufacturers.

Second polymer system 1006 having modulus 1035 comprises thermosetting epoxy system 1030 and epoxy curing agent 1032. Thermosetting epoxy system 1030 contains first epoxy 1034. Further, in some illustrative examples, thermosetting epoxy system 1030 also includes second epoxy 1036.

Thermosetting epoxy system 1030 may be selected to have properties 1050. Properties 1050 may include at least one of miscibility mismatch with first polymer system 1004, chemical structure similarity with first polymer system 1004, and modulus. Thermosetting epoxy system 1030 may be selected such that the viscosity of the uncured mixture of first polymer system 1004 and second polymer system 1006 has a desirable value.

In some illustrative examples, first epoxy 1034 may be one of diglycidyl ether of bisphenol a 1044, or bis((3,4-epoxy cyclohexyl)methyl) adipate a 1046.

Diglycidyl ether of bisphenol a 1044 may be denoted chemically as

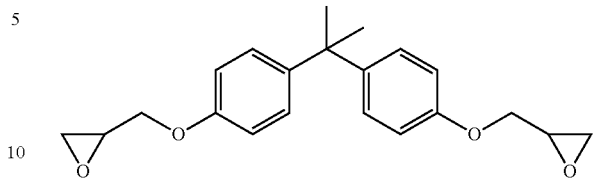

One example of commercially available diglycidyl ether of bisphenol a 1044 is Dow DER 332 1052.

Bis((3,4-epoxy cyclohexyl)methyl) adipate a 1046 may be denoted chemically as

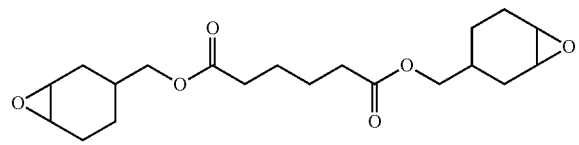 [SMILES: O=C(CCCCC(=O)OCC1CCC2OC2C1)OCC1CCC2OC2C1]

One example of commercially available bis((3,4-epoxy cyclohexyl)methyl) adipate a 1046 is synasia syna epoxy 28 1054.

In some illustrative examples, thermosetting epoxy system 1030 includes second epoxy 1036. In these illustrative examples, different concentrations of second epoxy 1036 within thermosetting epoxy system 1030 are desirable. In one illustrative example, thermosetting epoxy system 1030 includes about 50 weight percent of second epoxy 1036. In another illustrative example, thermosetting epoxy system 1030 includes about 30 weight percent second epoxy 1036. In yet another illustrative example, thermosetting epoxy system 1030 includes about 40 weight percent of second epoxy 1036.

Second epoxy 1036 may be selected to affect properties 1050. In some examples, second epoxy 1036 may be selected to decrease the viscosity of thermosetting epoxy system 1030 prior to cure. In other examples, second epoxy 1036 may be selected to decrease modulus 1035 of second polymer system 1006. In some illustrative examples, second epoxy 1036 may be polypropylene glycol diglycidyl ether 1058. Polypropylene glycol diglycidyl ether 1058 may be denoted chemically as

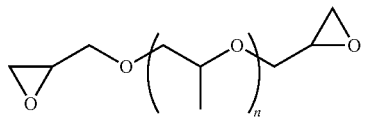

One example of commercially available polypropylene glycol diglycidyl ether 1058 is Dow DER 736 1062.

Epoxy curing agent 1032 may be selected from 2-ethyl-4-methyl imidazole 1038 and methylhexhydrophthalic anhydride 1040. Epoxy curing agent 1032 is selected based on properties 1042. Specifically, epoxy curing agent 1032 may be selected such that epoxy curing agent 1032 does not initiate the cure of first polymer system 1004 under room temperature. Additionally, epoxy curing agent 1032 may be selected such that epoxy curing agent 1032 does not cross-link second polymer system 1006 until after cure of first polymer system 1004 by one of a radiation source or an elevated temperature such as 140 degrees Fahrenheit.

When epoxy curing agent 1032 is 2-ethyl-4-methyl imidazole 1038, the ratio of epoxy curing agent 1032 to thermosetting epoxy system 1030 may be about 9 mol percent to about 31 mol percent. In some illustrative examples, when epoxy curing agent 1032 is 2-ethyl-4-methyl imidazole 1038, the ratio of epoxy curing agent 1032 to thermosetting epoxy system 1030 may be about 1:10 by weight. In other illustrative examples, the ratio of 2-ethyl-4-methyl imidazole 1038 to thermosetting epoxy system 1030 may be different. 2-ethyl-4-methyl imidazole 1038 may be denoted chemically as

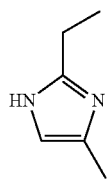

When epoxy curing agent 1032 is methylhexhydrophthalic anhydride 1040, the ratio of epoxy curing agent 1032 to thermosetting epoxy system 1030 may be about 45 weight percent to about 70 weight percent of epoxy curing agent 1032 per hundred weight percent thermosetting epoxy system 1030. In some illustrative examples, when epoxy curing agent 1032 is methylhexhydrophthalic anhydride 1040, the ratio of epoxy curing agent 1032 to thermosetting epoxy system 1030 is about 7:10 by weight. In other illustrative examples, the ratio of methylhexhydrophthalic anhydride 1040 to thermosetting epoxy system 1030 may be different. Methylhexhydrophthalic anhydride 1040 may be denoted chemically as

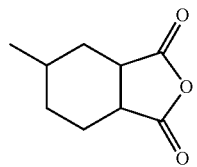

In some illustrative examples, interpenetrating polymer network adhesive 1002 may be used to join first part 1064 and second part 1066. First part 1064 may be formed of composite 1068 or metal 1070. Second part 1066 may be formed of composite 1072 or metal 1074.

In some illustrative examples, interpenetrating polymer network adhesive 1002 may be used as a resin within at least one of first part 1064 and second part 1066. For example, interpenetrating polymer network adhesive 1002 may form part of composite 1068 for first part 1064.

In curing interpenetrating polymer network adhesive 1002, first polymer system 1004 may be cured first. First polymer system 1004 may be cured using a radiation beam, such as radiation beam 45 of FIG. 3. As first polymer system 1004 is cured first, interpenetrating polymer network adhesive 1002 will develop strength using first polymer system 1004. In other words, at least one of thermosetting acrylate 1008 and trifunctional acrylate 1010 develops the strength of interpenetrating polymer network adhesive 1002. At least one of properties 1013 and properties 1028 may be selected to provide a desired strength to interpenetrating polymer network adhesive 1002 after the second curing of interpenetrating polymer network adhesive 1002.

Second polymer system 1006 may be cured second. As a result, second polymer system 1006 may provide flexibility to interpenetrating polymer network adhesive 1002. In other words, thermosetting epoxy system 1030 provides the flexibility of interpenetrating polymer network adhesive 1002. Properties 1050 may be selected such that a desired flexibility results after the second curing of interpenetrating polymer network adhesive 1002.

In some examples, toughness of interpenetrating polymer network adhesive 1002 may be developed through a mismatch between modulus 1012 and modulus 1035. Specifically, toughness of interpenetrating polymer network adhesive 1002 may be developed when modulus 1035 is 60% or less of the value of modulus 1012.

In one illustrative example, thermosetting epoxy system 1030 comprises 50 weight percent diglycidyl ether of bisphenol a 1044 and 50 weight percent polypropylene glycol diglycidyl ether 1058, and has modulus 1035 of about 141 ksi. In another illustrative example, thermosetting epoxy system 1030 comprises 70 weight percent diglycidyl ether of bisphenol a 1044 and 30 weight percent polypropylene glycol diglycidyl ether 1058, and has modulus 1035 of about 399 ksi.

In some examples, toughness of interpenetrating polymer network adhesive 1002 may also be developed through chemical cross-linking of first polymer system 1004 and thermosetting epoxy system 1030. Specifically, during a thermal cure, unreacted acrylate groups of first polymer system 1004 may react with thermosetting epoxy system 1030 to provide chemical linkages. Thermoplastic tougheners are not used in interpenetrating polymer network adhesive 1002.

Several phenomena may occur due to selecting materials for first polymer system 1004 and second polymer system 1006. In one illustrative example, the presence of thermosetting epoxy system 1030 monomer reduces the rate of the normally fast first polymer system 1004 reaction. The presence of thermosetting epoxy system 1030 monomer may enable more diffusion than if thermosetting epoxy system 1030 monomer were not present. This increased diffusion may increase the degree of monomer conversion in first polymer system 1004.

In some illustrative examples, the selection of bisphenol a diacrylate 1014 and diglycidyl ether of bisphenol a 1044 may enhance compatibility and reduce the tendency of first polymer system 1004 and second polymer system 1006 to separate within interpenetrating polymer network adhesive 1002.

Although sequential interpenetrating polymer network adhesives are discussed above, in some illustrative examples, interpenetrating polymer network adhesive 1002 may be formed as a simultaneous interpenetrating polymer network adhesive. In sequential interpenetrating polymer network adhesives, cure of first polymer system 1004 may be initiated first and cure of second polymer system 1006 may be initiated second. A simultaneous interpenetrating polymer network adhesive has cure of first polymer system 1004 and second polymer system 1006 initiated at substantially the same time. In a simultaneous interpenetrating polymer network adhesive, cure of first polymer system 1004 cures at a significantly faster rate than second polymer system 1006. As a result, second polymer system 1006 may still be in the initial stages of curing after curing of first polymer system 1004 is complete. In such illustrative examples, epoxy curing agent 1032 may be 2-ethyl-4- methyl imidazole 1038. In one illustrative example, a simultaneous interpenetrating polymer network adhesive may be formed at a slightly elevated temperature such as about 140 degrees Fahrenheit. In this illustrated example, first polymer system 1004 may be cured in about a minute or less while second polymer system 1006 may be cured in about two to four hours.

The illustration of manufacturing environment 1000 in FIG. 10 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment. For example, without limitation, composite panel forming environment 1000 may further include a radiation source, such as radiation source 47 of FIG. 3.

Figure 11:
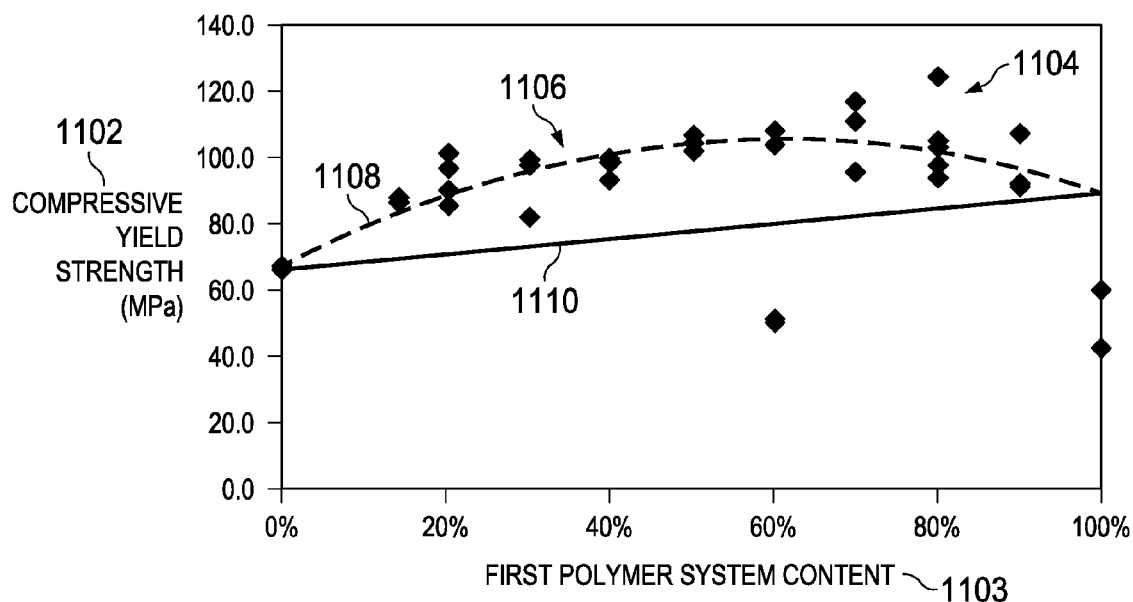
FIG. 11 is an illustration of a graphical plot of compressive yield strength versus first polymer system content of an interpenetrating polymer network in accordance with illustrative embodiments.

FIG. 11 is an illustration of a graphical plot of compressive yield strength versus first polymer system content of an interpenetrating polymer network in accordance with illustrative embodiments. As can be seen from FIG. 11, compressive yield strength 1102 is plotted against first polymer system content 1103 for interpenetrating polymer network adhesives. Interpenetrating polymer network adhesives in this example comprise formulations in which the thermosetting acrylate comprises bisphenol a diacrylate and the thermosetting epoxy system comprises 50 weight percent of diglycidyl ether of bisphenol a and 50 weight percent of polypropylene glycol diglycidyl ether. As depicted, compressive yield strength data 1104 for interpenetrating polymer network adhesives does not follow linear rule of mixtures 1106. The linear rule of mixtures states that a composite's properties are the combination of properties in its two constituent materials. The composite property equals the sum of the respective volume percentage of a constituent multiplied by the value of the material property of the constituent. As depicted, linear rule of mixtures 1106 for a mixture of bisphenol a diacrylate, diglycidyl ether of bisphenol a, and polypropylene glycol diglycidyl ether consists of upper bound 1108 and lower bound 1110. In the cases where a composition has a value outside of linear rule of mixtures 1106, the composition has an unexpected value for compressive yield strength 1102.

Figure 12:
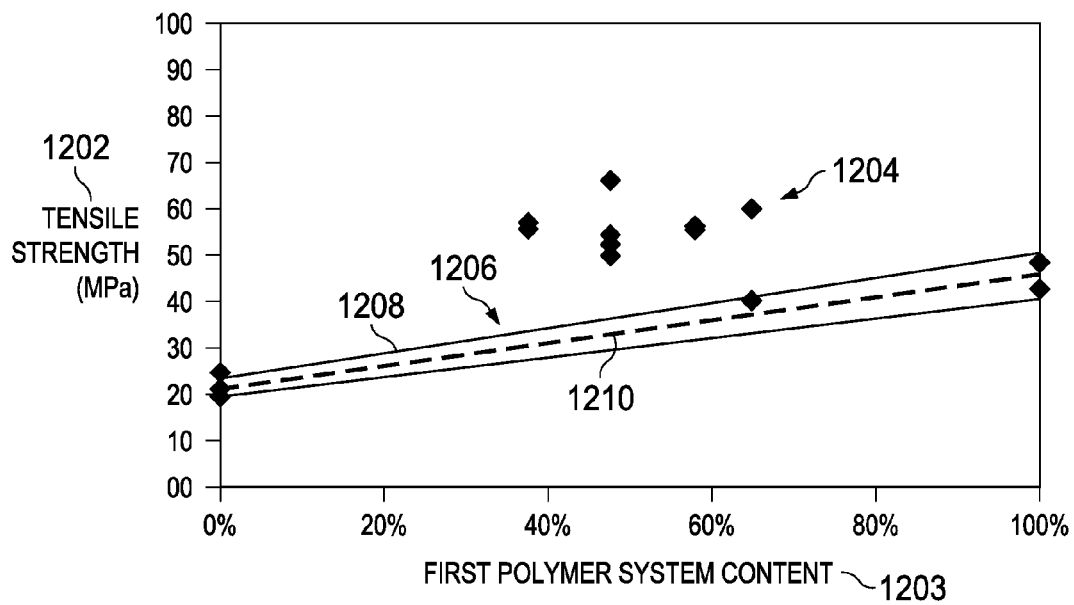
FIG. 12 is an illustration of a graphical plot of tensile strength versus first polymer system content of interpenetrating polymer networks in accordance with illustrative embodiments.

FIG. 12 is an illustration of a graphical plot of tensile strength versus thermosetting first polymer system content of interpenetrating polymer networks in accordance with illustrative embodiments. As can be seen from FIG. 12, tensile strength 1202 is plotted against first polymer system content 1203 for interpenetrating polymer network adhesives. Interpenetrating polymer network adhesives in this example comprise formulations in which the first polymer system comprises 80 weight percent of a thermosetting acrylate and 20 weight percent of a trifunctional acrylate. In other words, the first polymer system comprises a ratio of the thermosetting acrylate to the trifunctional acrylate where the ratio is about 4:1 by weight. The thermosetting acrylate comprises bisphenol a diacrylate, the trifunctional acrylate is trimethylolpropane triacrylate, and the thermosetting epoxy system comprises 50 weight percent of diglycidyl ether of bisphenol a and 50 weight percent of polypropylene glycol diglycidyl ether. As depicted, tensile strength data 1204 for interpenetrating polymer network adhesives does not follow linear rule of mixtures 1206. As depicted, linear rule of mixtures 1206 for a mixture of bisphenol a diacrylate, trimethylolpropane triacrylate, diglycidyl ether of bisphenol a, and polypropylene glycol diglycidyl ether consists of upper bound 1208 and lower bound 1210. In the cases where a composition has a value outside of linear rule of mixtures 1206, the composition has an unexpected value for normalized tensile strength 1202. As can be seen in FIG. 12, interpenetrating polymer network adhesives have greater tensile strength 1202 than linear rule of mixtures 1206. Accordingly, interpenetrating polymer network adhesives exhibit a desirably greater strength than their constituents.

Figure 13:
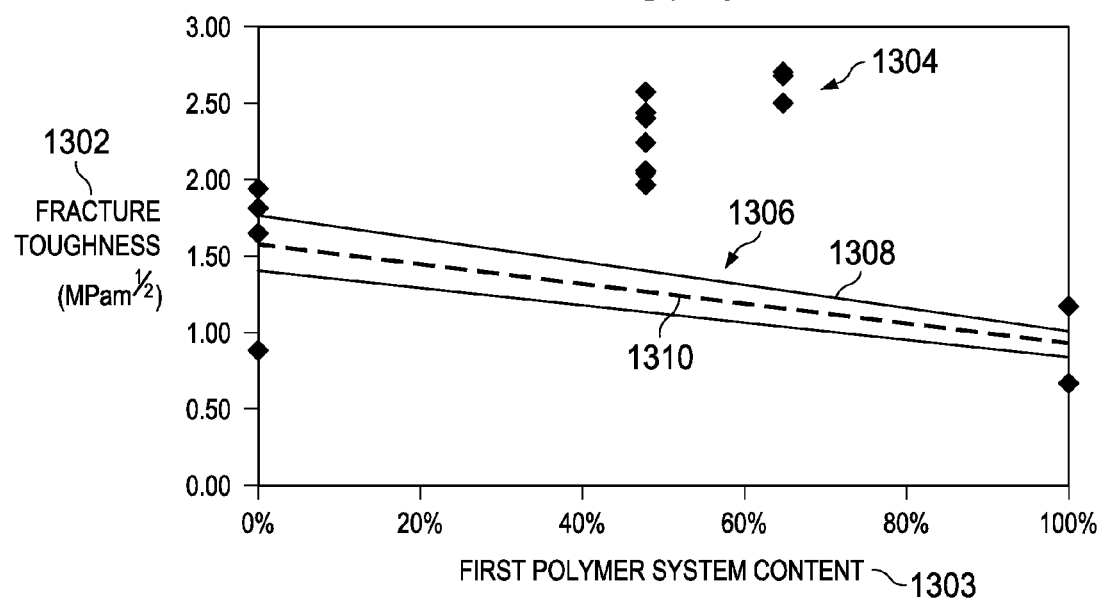
FIG. 13 is an illustration of a graphical plot of fracture toughness versus first polymer system content of interpenetrating polymer networks in accordance with illustrative embodiments.

FIG. 13 is an illustration of a graphical plot of fracture toughness versus first polymer system content of interpenetrating polymer networks in accordance with illustrative embodiments. As can be seen from FIG. 13, fracture toughness 1302 is plotted against first polymer system content 1303 for interpenetrating polymer network adhesives. Like in FIG. 12, the interpenetrating polymer network adhesives in this example comprise formulations in which the first polymer system comprises 80 weight percent of a thermosetting acrylate and 20 weight percent of a trifunctional acrylate. The thermosetting acrylate comprises bisphenol a diacrylate, the trifunctional acrylate is trimethylolpropane triacrylate, and the thermosetting epoxy system comprises 50 weight percent of diglycidyl ether of bisphenol a and 50 weight percent of polypropylene glycol diglycidyl ether. As depicted, fracture toughness data 1304 for interpenetrating polymer network adhesives does not follow linear rule of mixtures 1306. As depicted, linear rule of mixtures 1306 for a mixture of bisphenol a diacrylate, trimethylolpropane triacrylate, diglycidyl ether of bisphenol a, and polypropylene glycol diglycidyl ether consists of upper bound 1308 and lower bound 1310. In the cases where a composition has a value outside of linear rule of mixtures 1306, the composition has an unexpected value for fracture toughness 1302.

As can be seen in FIG. 13, interpenetrating polymer network adhesives have greater fracture toughness 1302 than linear rule of mixtures 1306. Accordingly, interpenetrating polymer network adhesives exhibit a desirably greater toughness than their individual constituents.

Figure 14:
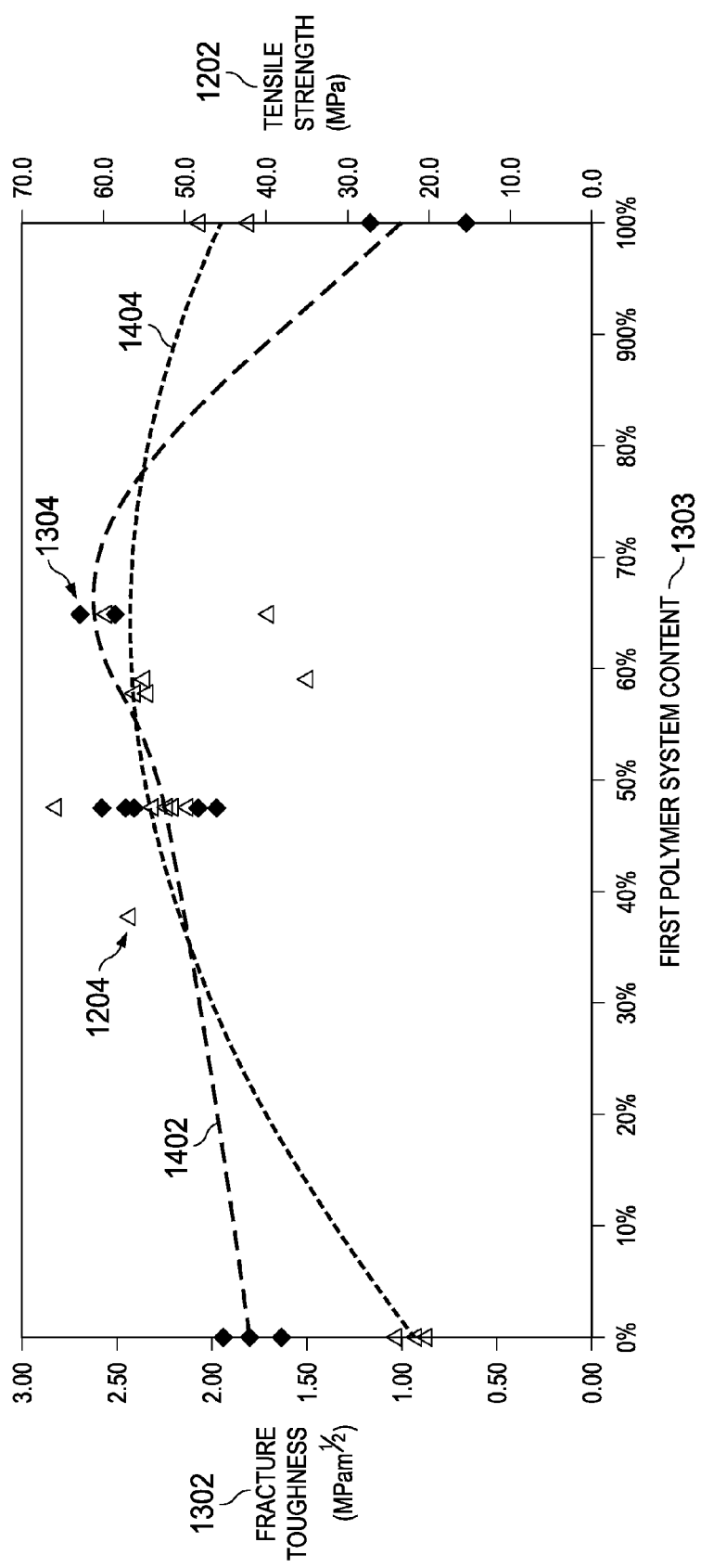
FIG. 14 is an illustration of a graphical plot of tensile strength and fracture toughness versus first polymer system content of interpenetrating polymer networks in accordance with illustrative embodiments.

FIG. 14 is an illustration of a graphical plot of tensile strength and fracture toughness versus first polymer system content of interpenetrating polymer networks in accordance with illustrative embodiments. Specifically, FIG. 14 is an overlay of FIGS. 12 and 13.

Fracture toughness data 1304 from FIG. 13 for interpenetrating polymer networks is presented with toughness trend 1402. Toughness trend 1402 is a trend line for the points of toughness data for interpenetrating polymer networks. Tensile strength data 1204 for interpenetrating polymer networks is presented with tensile strength trend 1404. Tensile strength trend 1404 is a trend line for the points of tensile strength data 1204.

In most conventional materials, there is a trade-off between strength and toughness. Specifically, in most conventional materials, when strength increases, toughness decreases. Further, in most conventional materials, when toughness increases, strength decreases.

As can be seen from FIG. 14, toughness trend 1402 increases until about 70% first polymer system content 1303. As depicted, tensile strength trend 1404 increases until about 70% first polymer system content 1303. In this illustrative example, interpenetrating polymer networks having first polymer system contents between about 60% first polymer system content and about 80% first polymer system content may be desirable. These interpenetrating polymer networks may be desirable based on intersecting desirable fracture toughness and desirable tensile strength. As can be seen in FIG. 14, between about 60% first polymer system content and about 80% first polymer system content, toughness trend 1402 and tensile strength trend 1404 have highest values.

Figure 15:
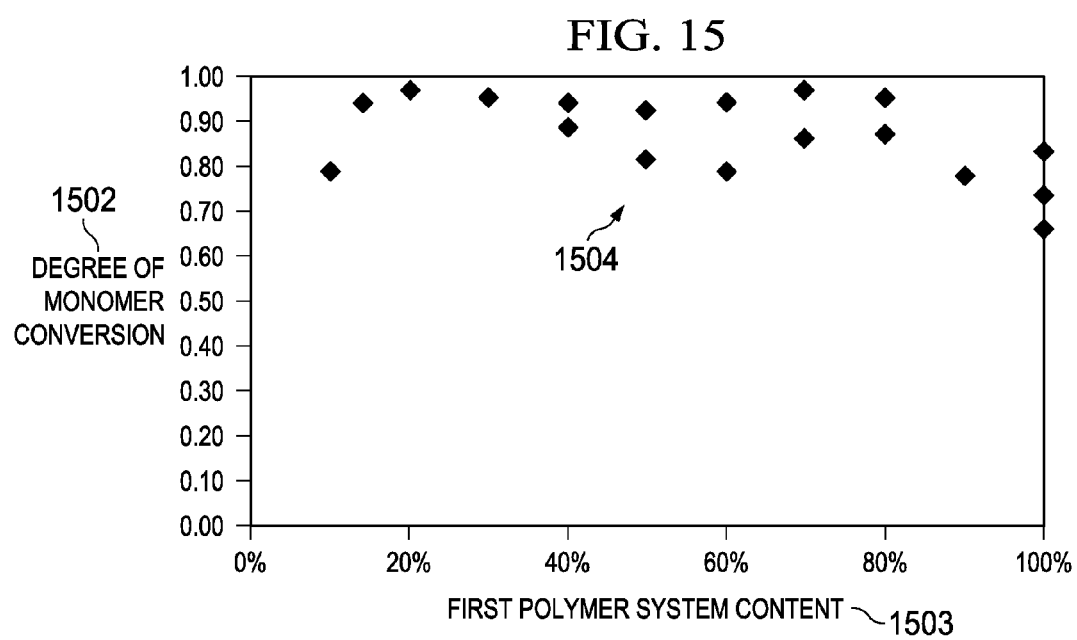
FIG. 15 is an illustration of a graphical plot of degree of monomer conversion versus first polymer system content of interpenetrating polymer networks in accordance with illustrative embodiments.

FIG. 15 is an illustration of a graphical plot of degree of monomer conversion versus first polymer system content of interpenetrating polymer networks in accordance with illustrative embodiments. As can be seen from FIG. 15, degree of monomer conversion 1502 is plotted against first polymer system content 1503 for interpenetrating polymer network adhesives. In FIG. 15, the interpenetrating polymer network adhesives in this example comprise formulations in which the thermosetting acrylate comprises bisphenol a diacrylate and the thermosetting epoxy system comprises 50 weight percent of diglycidyl ether of bisphenol a and 50 weight percent of polypropylene glycol diglycidyl ether.

In curing a material, a degree of monomer conversion near 1.0 is desirable. Lower degrees of monomer conversion are less desirable. A degree of monomer conversion may also be referred to as a degree of cure.

Degree of monomer conversion data 1504 for interpenetrating polymer network adhesives is depicted. As can be seen from FIG. 15, degree of monomer conversion data 1504 for interpenetrating polymer network adhesives having first polymer system content 1503 between about 20 weight percent and about 80 weight percent exhibit the highest, and therefore most desirable, degrees of monomer conversion.

Figure 16:
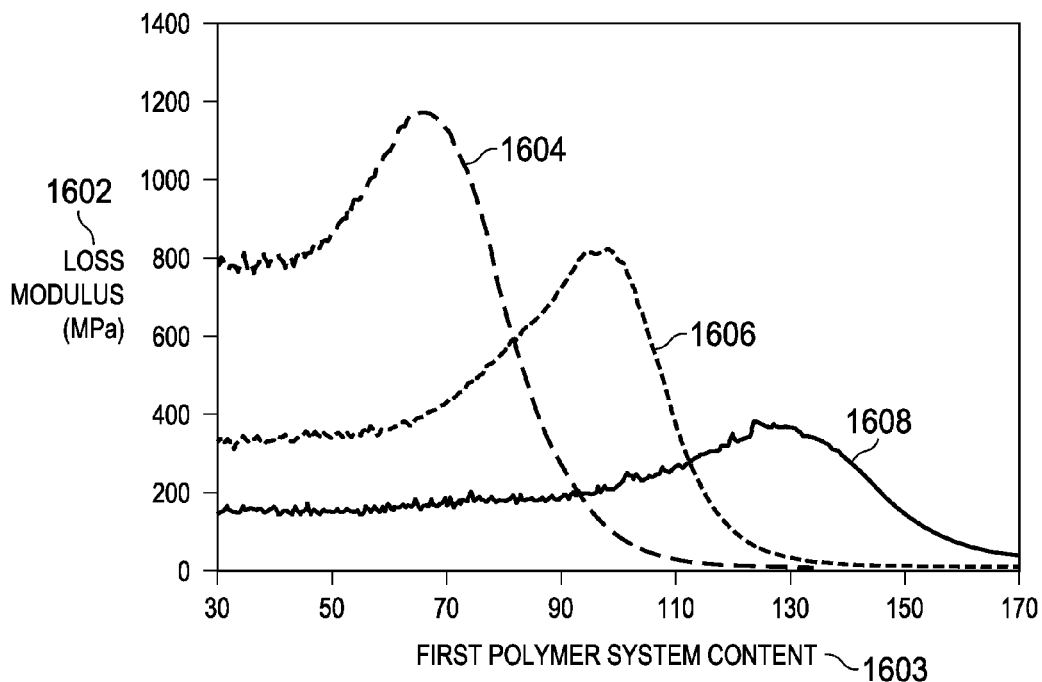
FIG. 16 is an illustration of a graphical plot of loss modulus versus temperature of interpenetrating polymer networks in accordance with illustrative embodiments.

FIG. 16 is an illustration of a graphical plot of loss modulus versus temperature of interpenetrating polymer networks in accordance with illustrative embodiments. As can be seen from FIG. 16, the compositions exhibit a single glass transition temperature. A single glass transition temperature is indicative of a interpenetrating polymer network when the composition is a mixture of two different components.

As can be seen in FIG. 16, first composition 1604 exhibits a single glass transition temperature. First composition 1604 is a composition having about 48 weight percent first polymer system. In this example, the first polymer system is about 80 weight percent bisphenol a diacrylate and about 20 weight percent trimethylolpropane triacrylate. In this example, the second polymer system has a thermosetting epoxy system that is about 50 weight percent diglycidyl ether of bisphenol a and about 50 weight percent polypropylene glycol diglycidyl ether. First composition also includes 2-ethyl-4-methyl imidazole as a cure agent.

As can be seen from FIG. 16, second composition 1606 exhibits a single glass transition temperature. Second composition 1606 is a composition having bisphenol a diacrylate as the first polymer system. Second composition has Bis((3,4-epoxy cyclohexyl)methyl)adipate as a thermosetting epoxy system. Second composition also includes methylhexahydroPhthalic Anhydride as a cure agent.

As can be seen in FIG. 16, third composition 1608 exhibits a single glass transition temperature. Third composition 1608 is a composition having about 48 weight percent first polymer system. In this example, the first polymer system is bisphenol a diacrylate. In this example, the second polymer system has a thermosetting epoxy system that is about 70 weight percent diglycidyl ether of bisphenol a and about 30 weight percent polypropylene glycol diglycidyl ether. Third composition also includes 2-ethyl-4-methyl imidazole as a cure agent.

Figure 17:
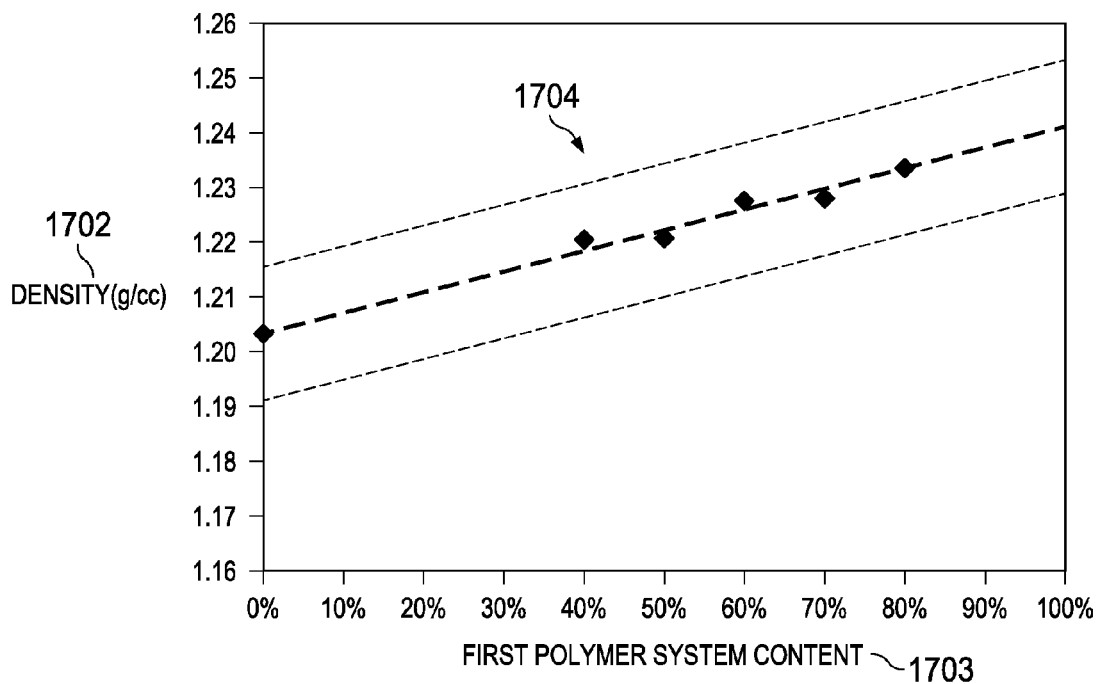
FIG. 17 is an illustration of a graphical plot of density versus first polymer system content of interpenetrating polymer networks in accordance with illustrative embodiments.

FIG. 17 is an illustration of a graphical plot of density versus first polymer system content of interpenetrating polymer networks in accordance with illustrative embodiments. In FIG. 17, density 1702 is plotted against first polymer system content 1703 for interpenetrating polymer network adhesives 1704. In this illustrative example, interpenetrating polymer network adhesives 1704 have bisphenol a diacrylate as the first polymer system. In this illustrative example, the second polymer system is about 50 weight percent diglycidyl ether of bisphenol a and about 50 weight percent polypropylene glycol diglycidyl ether.

As can be seen, densities of interpenetrating polymer network adhesives 1704 follows the linear rule of mixtures. As the densities of interpenetrating polymer network adhesives 1704 follows the linear rule of mixtures, improved packing factor is not the source of the improved toughness and strength of interpenetrating polymer network adhesives 1704.

FIG. 18 is an illustration of a graphical plot of short beam shear results for an interpenetrating polymer network in contrast to its constituents. In FIG. 18, force 1802 of an interpenetrating polymer network adhesive 1804 is greater than its constituents. Specifically, the force of an interpenetrating polymer network is greater than both its first polymer system 1806 and second polymer system 1808.

In this example, first polymer system 1806 comprises 80 weight percent of a thermosetting acrylate and 20 weight percent of trifunctional acrylate. In this example, the thermosetting acrylate is bisphenol a diacrylate. In this example, the trifunctional acrylate is trimethylolpropane triacrylate. In this example, second polymer system 1808 comprises a thermosetting epoxy system and epoxy curing agent. In this example, the thermosetting epoxy system comprises 50 weight percent diglycidyl ether of bisphenol a and 50 weight percent polypropylene glycol diglycidyl ether. In this example, the epoxy curing agent comprises 2-ethyl-4-methyl imidazole. The second polymer system 1808 comprises 10 parts per hundred of the epoxy curing agent. The interpenetrating polymer network adhesive 1804 comprises 50 weight percent of the first polymer system 1806 and 50 weight percent of the second polymer system 1808.

Using the linear rule of mixtures, an expected value for force for a combination of first polymer system 1806 and second polymer system 1808 would be between about 22 MPa and 11 MPa. Specifically, for a combination of about 50 weight percent of first polymer system 1806 and about 50 weight percent of second polymer system 1808, an expected value for force would be about 17 MPa.

In FIG. 18, interpenetrating polymer network adhesive 1804 has an unexpected force 1802 as interpenetrating polymer network adhesive 1804 has a higher force 1802 than either of its constituents. Accordingly, interpenetrating polymer network adhesive 1804 exhibits more desirable adhesive characteristics than its constituents.

Referring next to FIGS. 19 and 20, embodiments of the disclosure may be used in the context of an aircraft manufacturing and service method 68 as shown in FIG. 19 and an aircraft 70 as shown in FIG. 20. During pre-production, exemplary method 68 may include specification and design 72 of the aircraft 70 and material procurement 74. During production, component and subassembly manufacturing 76 and system integration 78 of the aircraft 70 takes place. The disclosed IPN adhesive 16 may be used to assemble parts and subassemblies as part of the manufacturing process step 76. Thereafter, the aircraft 70 may go through certification and delivery 80 in order to be placed in service 82. While in service by a customer, the aircraft 70 may be scheduled for routine maintenance and service 166 (which may also include modification, reconfiguration, refurbishment, and so on), in which the IPN adhesive 16 may be used to repair or refurbish parts and assemblies.

Each of the processes of method 68 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 70 produced by exemplary method 68 may include an airframe 86 with a plurality of systems 88 and an interior 90. Examples of high-level systems 88 include one or more of a propulsion system 92, an electrical system 94, a hydraulic system 96, and an environmental system 98. Any number of other systems may be included. The disclosed IPN adhesive 16 may be used to fabricate parts used in the airframe 86 and in the interior 90. Although an aerospace example is shown, the principles of the invention may be applied to other industries, such as the automotive industry.

The apparatus embodied herein may be employed during any one or more of the stages of the method 68. For example, components or subassemblies corresponding to production process 78 may be fabricated or manufactured in a manner similar to components or subassemblies produced while the aircraft 70 is in service. Also, one or more apparatus embodiments may be utilized during the production stages 76 and 78, for example, by substantially expediting assembly of or reducing the cost of an aircraft 152. Similarly, one or more apparatus embodiments may be utilized while the aircraft 70 is in service, for example and without limitation, to maintenance and service 84.

In one illustrative embodiment, a method of bonding two parts together is present. The method comprises placing the parts together with a layer of an interpenetrating polymer network (IPN) adhesive between the parts; attaching the parts to each other by curing a first polymer system of the IPN adhesive using radiation energy; and thermally curing a second flexible polymer system of the IPN adhesive after the first polymer system has been cured. In some illustrative examples, curing the first adhesive system is performed substantially at room temperature using a beam of the radiation energy, and thermally curing the second adhesive system is performed at a temperature above room temperature. In one illustrative example, the first polymer system is cured to a stage that allows handling of the parts. In another illustrative example, the first polymer system is an acrylated epoxy forming a first substantially continuous structure when cured that attaches and holds the parts together until the second polymer system is cured. In another illustrative example, the second polymer system is selected from the group consisting of: a substantially flexible epoxy, and a substantially flexible vinyl ester. In yet another illustrative example, the parts have respectively different coefficients of thermal expansion. In yet a further illustrative example, one of the parts is a fiber reinforced composite and the other of the parts includes metal.

In another illustrative embodiment, a method of fabricating a composite structure is present. The method comprises laying up first and second composite laminates each having a fiber reinforced interpenetrating polymer network (IPN) matrix including a first polymer adhesive system and a flexible second polymer adhesive system; curing the first polymer adhesive system; assembling the first and second laminates together with a layer of the second polymer adhesive system therebetween; and curing the second polymer adhesive system. In one illustrative example, curing the first polymer adhesive system is performed at substantially room temperature by a beam of radiation. In another illustrative example, curing the first polymer adhesive system is performed at substantially room temperature by a beam of radiation, and curing the second polymer adhesive system is performed by co-curing the assembled laminates and the layer of adhesive during a thermal cure cycle after the first polymer adhesive system has been cured. In one illustrative example, curing of the first polymer adhesive system is performed before the first and second laminates are assembled together and provides the laminates with sufficient rigidity to allow handling of the laminates. In a further illustrative example, the curing of the second polymer adhesive system produces a substantially continuous flexible polymer structure extending through the first and second laminates and the bond.

In one illustrative embodiment, an interpenetrating polymer network (IPN) adhesive is presented. The interpenetrating polymer network (IPN) adhesive comprises an acrylated polymer system curable by radiation; and a flexible epoxy system thermally curable after the acrylated polymer system is cured. In one illustrative example, the acrylated polymer system is an acrylated epoxy. In another illustrative example, the acrylated polymer system is an acrylated epoxy and the acrylated epoxy is curable by radiation selected from the group consisting of an electron beam, ultraviolet light and x-rays. In another illustrative example, the flexible polymer system is one selected from the group consisting of: a flexible epoxy, and a flexible vinyl ester. In yet another illustrative example, the acrylated polymer system is an acrylated epoxy and the acrylated epoxy includes at least one of: bisphenol, a diacrylate (BPADA) with A trifunctional acrylate, trimethylolpropane, and a triacrylate (TMPTA) cross-linking agent. In yet another illustrative example, the acrylated polymer system is an acrylated epoxy and the flexible epoxy system is selected from the group consisting of: Bis(3,4-EpoxyCyclohexylmethyl) Adipate (BECA), and a combination of a Diglycidyl ether of bisphenol A (DGEBA) with a Polypropylene Glycol Diglycidyl Ether (PPGDE) chain extender. In a further illustrative example, the flexible polymer system includes a thermal cure initiator.

In one illustrative embodiment, a reinforced composite structure is present. The reinforced composite structure comprises a reinforcement; and a matrix in which the reinforcement is embedded, the matrix including an interpenetrating polymer network (IPN) forming a gradient interface around the reinforcement resulting in improved shear force transfer from the matrix to the reinforcement. In one illustrative example, the IPN is a bi-continuous structure including an acrylated polymer and a flexible epoxy, and the reinforcement includes fibers selected from the group consisting of carbon, fiberglass and an aramid.

In yet a further illustrative embodiment, a method of bonding metal and composite parts together is present. This method comprises placing the parts together with a layer of an interpenetrating polymer network (IPN) adhesive between the parts; attaching the parts to each other by curing a first polymer system of the IPN adhesive at room temperature using an electron beam of radiant energy until the parts have sufficient rigidity to be handled, wherein the first polymer system is an acrylated epoxy forming a first substantially continuous structure when cured that attaches and locks the parts together until the second polymer system is cured; and thermally curing a second flexible polymer system of the IPN adhesive after the first polymer system has been cured using a thermal cure cycle above room temperature, wherein the second polymer system is selected from the group consisting of a substantially flexible epoxy, and a substantially flexible vinyl ester.

In yet another illustrative embodiment, an interpenetrating polymer network (IPN) adhesive is present. The interpenetrating polymer network (IPN) adhesive comprises an acrylated epoxy system curable by radiation selected from the group consisting of an electron beam, ultraviolet light and x-rays, wherein the acrylated epoxy system includes at least one of—bisphenol, a diacrylate (BPADA) with A trifunctional acrylate, trimethylolpropane, and a triacrylate (TMPTA) cross-linking agent; and a flexible epoxy system thermally curable after the acrylated epoxy system is cured, wherein the flexible epoxy system includes a thermal cure initiator and is selected from the group consisting of Bis(3, 4-EpoxyCyclohexylmethyl) Adipate (BECA), and a combination of a Diglycidyl ether of bisphenol A (DGEBA) with a Polypropylene Glycol Diglycidyl Ether (PPGDE) chain extender.

An interpenetrating polymer network (IPN) adhesive comprises an acrylated polymer system curable by radiation, and a flexible epoxy system thermally curable after the acrylated polymer system is cured. According to one disclosed embodiment, a method is provided of bonding two parts together. The method comprises placing the parts together with a layer of IPN adhesive between the parts and attaching the parts to each other by curing the first polymer system of the IPN adhesive using radiation energy. The method further comprises thermally curing a second flexible polymer system of the IPN adhesive after the first polymer system has been cured. Curing the first adhesive system is performed substantially at room temperature using a beam of radiation, such as an electron beam, and the second adhesive system is thermally cured at a temperature above room temperature. The first polymer system is cured to at least a stage which renders the part sufficiently rigid to allow the part to be handled during subsequent processing steps. The first polymer system may comprise an acrylated epoxy that forms a substantially continuous structure when cured that attaches and holds the parts together until the second polymer system is cured. The second polymer system may be selected from the group consisting of a substantially flexible epoxy and a substantially flexible vinyl ester.

According to another disclosed embodiment, a method is provided of fabricating a composite structure. The method comprises laying up first and second composite laminates each having a fiber reinforced IPN matrix including a first polymer adhesive system, and a flexible second polymer adhesive system. The method further comprises curing the first polymer adhesive system and assembling the first and second laminates together with a layer of the second polymer adhesive system therebetween. The method further comprises curing the second polymer adhesive system. The first polymer adhesive system is cured substantially at room temperature by a beam of radiation. The second polymer adhesive system is cured by co-curing the assembled laminates and the layer of adhesive during a thermal cure cycle after the first polymer adhesive system has been cured.

According to still another embodiment, an IPN adhesive comprises an acrylated polymer system curable by radiation, and a flexible epoxy system cured after the acrylated polymer system is cured. The acrylated polymer system may comprise an acrylated epoxy, and the radiation may be selected from the group consisting of an electron beam, ultraviolet light and x-ray radiation. The flexible polymer system may be one selected from a group consisting of a flexible epoxy and a flexible vinyl ester.

In accordance with another embodiment, a reinforced composite structure is provided. The composite structure comprises a reinforcement, and a matrix in which the reinforcement is embedded. The matrix includes an IPN forming a gradient interface around the reinforcement resulting in improved shear force transfer from the matrix to the reinforcement. The reinforcement may include fibers selected from the group consisting of carbon, fiberglass and an aramid. The IPN is a bi-continuous structure including an acrylated polymer and a flexible epoxy.

Although the embodiments of this disclosure have been described with respect to certain exemplary embodiments, it is to be understood that the specific embodiments are for purposes of illustration and not limitation, as other variations will occur to those of skill in the art.

What is claimed:

1. A composition consisting essentially of:
   a first polymer system having a first modulus of about 180 ksi to about 335 ksi consisting essentially of:
      a thermosetting acrylate; and
      a trifunctional acrylate, wherein the thermosetting acrylate is bisphenol A diacrylate, wherein the trifunctional acrylate is trimethylolpropane triacrylate, and wherein a ratio of the thermosetting acrylate to the trifunctional acrylate is about 4:1 by weight; and
   a second polymer system consisting essentially of:
      a thermosetting epoxy system comprising a first epoxy; and
      an epoxy curing agent.

2. The composition of claim 1, wherein the second polymer system has a second modulus, wherein the second modulus has a value of about 60 percent or less of the first modulus.

3. The composition of claim 1, wherein the first epoxy is diglycidyl ether of bisphenol A and wherein the thermosetting epoxy system further comprises polypropylene glycol diglycidyl ether.

4. The composition of claim 3, wherein the thermosetting epoxy system comprises about 50 weight percent of diglycidyl ether of bisphenol A and about 50 weight percent of polypropylene glycol diglycidyl ether.

5. The composition of claim 3, wherein the thermosetting epoxy system comprises about 60 weight percent of diglycidyl ether of bisphenol A and about 40 weight percent of polypropylene glycol diglycidyl ether.

6. The composition of claim 3, wherein the thermosetting epoxy system comprises about 70 weight percent of diglycidyl ether of bisphenol A and about 30 weight percent of polypropylene glycol diglycidyl ether.

7. The composition of claim 1, wherein the first epoxy is bis((3,4-epoxy cyclohexyl)methyl)adipate.

8. The composition of claim 1, wherein the epoxy curing agent is 2-ethyl-4-methyl imidazole, and wherein a ratio of the epoxy curing agent to the thermosetting epoxy system is about 1:10 by weight.

9. The composition of claim 1, wherein the epoxy curing agent is 2-ethyl-4-methyl imidazole, and wherein a ratio of the epoxy curing agent to the thermosetting epoxy system is about 9 mol percent to about 31 mol percent.

10. The composition of claim 1, wherein the epoxy curing agent is methylhexahydrophthalic anhydride, and wherein a ratio of the epoxy curing agent to the thermosetting epoxy system is about 45 weight percent to about 70 weight percent of the epoxy curing agent per hundred weight percent thermosetting epoxy system.

11. A composition consisting essentially of:
a first polymer system having a first modulus of about 180 ksi to about 335 ksi consisting essentially of:
a thermosetting acrylate; and
a trifunctional acrylate, wherein the thermosetting acrylate is bisphenol A diacrylate, wherein the trifunctional acrylate is trimethylolpropane triacrylate, and wherein a ratio of the thermosetting acrylate to the trifunctional acrylate is about 3:2 by weight and a second polymer system consisting essentially of:
a thermosetting epoxy system comprising a first epoxy; and
an epoxy curing agent.

12. The composition of claim 11, wherein the second polymer system has a second modulus, wherein the second modulus has a value of about 60 percent or less of the first modulus.

13. The composition of claim 11, wherein the first epoxy is diglycidyl ether of bisphenol A and wherein the thermosetting epoxy system further comprises polypropylene glycol diglycidyl ether.

14. The composition of claim 13, wherein the thermosetting epoxy system comprises about 50 weight percent of diglycidyl ether of bisphenol A and about 50 weight percent of polypropylene glycol diglycidyl ether.

15. The composition of claim 13, wherein the thermosetting epoxy system comprises about 70 weight percent of diglycidyl ether of bisphenol A and about 30 weight percent of polypropylene glycol diglycidyl ether.

16. The composition of claim 13, wherein the thermosetting epoxy system comprises about 60 weight percent of diglycidyl ether of bisphenol A and about 40 weight percent of polypropylene glycol diglycidyl ether.

17. The composition of claim 11, wherein the epoxy curing agent is 2-ethyl-4-methyl imidazole, and wherein a ratio of the epoxy curing agent to the thermosetting epoxy system is about 1:10 by weight.

18. The composition of claim 11, wherein the first epoxy is bis((3,4-epoxy cyclohexyl)methyl)adipate.

19. The composition of claim 11, wherein the epoxy curing agent is 2-ethyl-4-methyl imidazole, and wherein a ratio of the epoxy curing agent to the thermosetting epoxy system is about 9 mol percent to about 31 mol percent.

20. The composition of claim 11, wherein the epoxy curing agent is methylhexahydrophthalic anhydride, and wherein a ratio of the epoxy curing agent to the thermosetting epoxy system is about 45 weight percent to about 70 weight percent of the epoxy curing agent per hundred weight percent thermosetting epoxy system.

* * * * *